(12) United States Patent
Noh et al.

(10) Patent No.: US 11,225,958 B2
(45) Date of Patent: Jan. 18, 2022

(54) LINEAR COMPRESSOR

(71) Applicant: LG Electronics Inc., Seoul (KR)

(72) Inventors: Kiwon Noh, Seoul (KR); Kichul Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 16/265,372

(22) Filed: Feb. 1, 2019

(65) Prior Publication Data
US 2019/0234391 A1   Aug. 1, 2019

(30) Foreign Application Priority Data

Feb. 1, 2018  (KR) .................... 10-2018-0013030
Feb. 1, 2018  (KR) .................... 10-2018-0013034

(51) Int. Cl.
| | |
|---|---|
| *F04B 39/06* | (2006.01) |
| *F04B 35/04* | (2006.01) |
| *F04B 39/12* | (2006.01) |
| *F04B 17/04* | (2006.01) |
| *H02K 9/22* | (2006.01) |
| *H02K 33/14* | (2006.01) |
| *F25B 31/02* | (2006.01) |

(52) U.S. Cl.
CPC .............. *F04B 39/06* (2013.01); *F04B 17/04* (2013.01); *F04B 35/04* (2013.01); *F04B 35/045* (2013.01); *F04B 39/12* (2013.01); *H02K 9/22* (2013.01); *F25B 31/023* (2013.01); *H02K 33/14* (2013.01)

(58) Field of Classification Search
CPC ...... F04B 35/045; F04B 35/04; F04B 39/121; F04B 17/04; F04B 39/06; F04B 39/12; H02K 33/16; H02K 1/145; H02K 33/14; H02K 9/22; F25B 31/023
See application file for complete search history.

(56) References Cited

U.S. PATENT DOCUMENTS 7,887,306 B2 *  2/2011  Lee ........................ F04B 39/127
                                                                    417/363
9,841,011 B2 * 12/2017  Kim ...................... F04B 35/045
(Continued)

FOREIGN PATENT DOCUMENTS

| EP | 1681756 | 7/2006 |
|---|---|---|
| JP | 2005195022 | 7/2005 |

(Continued)

OTHER PUBLICATIONS

Extended European Search Report in European Application No. 19152062.6, dated Mar. 26, 2019, 7 pages.

*Primary Examiner* — Peter J Bertheaud
(74) *Attorney, Agent, or Firm* — Fish & Richardson P.C.

(57) ABSTRACT

A linear compressor includes a cylinder that defines a compressor space and that is configured to compress refrigerant in the compressor space, a piston located in the cylinder and configured to perform a reciprocating motion in an axial direction relative to the cylinder, a mover coupled to the piston and configured to transmit a driving force to the piston to cause the piston to perform the reciprocating motion, a stator that defines a cylinder space that receives the cylinder, in which the stator is configured to generate the driving force together with the mover, and a supporting unit that includes an overlap portion that covers at least a portion of the stator, that is coupled to the stator, and that contacts the stator.

14 Claims, 23 Drawing Sheets

(56) References Cited

U.S. PATENT DOCUMENTS

| | | | |
|---|---|---|---|
| 2004/0251749 A1 | 12/2004 | Seong-Yeol | |
| 2006/0093495 A1* | 5/2006 | Oh | H02K 1/185 417/417 |
| 2006/0108880 A1* | 5/2006 | Lee | F04B 39/064 310/14 |
| 2006/0220473 A1* | 10/2006 | Ueda | H02K 33/16 310/12.25 |

FOREIGN PATENT DOCUMENTS

| | | |
|---|---|---|
| JP | 2008240574 | 10/2008 |
| KR | 100404109 | 11/2003 |
| KR | 20050015685 | 2/2005 |
| KR | 20140037686 | 3/2014 |
| KR | 20150040027 | 4/2015 |
| KR | 20160024217 | 3/2016 |
| WO | WO2009054631 | 4/2009 |

* cited by examiner

LINEAR COMPRESSOR

CROSS-REFERENCE TO RELATED APPLICATIONS

Pursuant to 35 U.S.C. § 119(a), this application claims the benefit of an earlier filing date of and the right of priority to Korean Application No. 10-2018-0013034 and Korean Application No. 10-2018-0013030, both filed on Feb. 1, 2018, the contents of which are incorporated by reference herein in their entirety.

TECHNICAL FIELD

The present disclosure relates to a linear compressor equipped with a linear motor.

BACKGROUND

A compressor is an apparatus that can receive power from a power generating device such as a motor or a turbine and compress a working fluid such as air or refrigerant. Compressors are widely applied to industrial fields and household appliances, for example, in steam compression refrigeration cycles (hereinafter, referred to as "refrigeration cycles"), and the like.

The compressors may be classified into a reciprocal compressor, a rotary compressor, and a scroll compressor according to a method of compressing refrigerant. A reciprocal compressor may be configured such that a compression space is formed between a piston and a cylinder, and a fluid is compressed while the piston performs a linear motion. A rotary compressor may be configured to compress a fluid by a roller which is eccentrically rotated inside a cylinder, and a scroll compressor may be configured to compress a fluid as a pair of scrolls formed in a spiral shape are rotated in an engaged state with each other.

The reciprocal compressor may be classified into a crank type in which a refrigerant is compressed by converting rotational force of a rotary motor into a linear motion, and an oscillating type in which a refrigerant is compressed using a linear motor performing a linear reciprocating motion. The oscillating type reciprocal compressor may be referred to as a linear compressor. The linear compressor may have an improved efficiency and a simple structure, which may reduce mechanical loss caused by conversion from a rotary motion into a linear motion.

In some cases, the linear compressors may be classified into an oil-lubricated linear compressor and a gas-lubricated linear compressor according to a lubrication method. For example, an oil-lubricated linear compressor may be configured such that a predetermined amount of oil is stored in a casing, and the oil is used for lubricating between a cylinder and a piston. In another example, a gas-lubricated linear compressor may have a structure in which a part of refrigerant discharged from a compression space is induced to a gap between a cylinder and a piston to lubricate between the cylinder and the piston by gas force of the refrigerant instead of storing oil in a casing.

In some cases, the oil-lubricated linear compressor (hereinafter, referred to as an "oil-lubricated compressor") may limit the cylinder and the piston from being overheated by motor heat, compression heat, etc., as oil of relatively low temperature is supplied between the cylinder and the piston. In some cases, the oil-lubricated compressor may restrict a refrigerant passing through a suction flow path of the piston from being introduced into a compression chamber of the cylinder and heated to have an increased specific volume, thereby preventing an occurrence of a suction loss in advance.

In some cases, in the oil-lubricated compressor, if oil discharged to a refrigeration cycle apparatus together with a refrigerant does not return to the compressor, an oil shortage may occur in the casing of the compressor, which may deteriorate reliability of the compressor.

In some implementations, the gas-lubricated linear compressor (hereinafter, "gas-lubricated compressor") may have a reduced size compared with the oil-lubricated compressor, and have an improved reliability as a refrigerant lubricates between the cylinder and the piston.

In some cases, in the gas-lubricated compressor, if motor heat generated in a linear motor and compression heat generated during compression of a refrigerant are not sufficiently cooled, the efficiency of the compressor may decrease.

In some cases, in the gas-lubricated compressor, although a stator of the linear motor is supported on a frame, contact surfaces between the stator and the frame may have a gap therebetween due to a machining error. In this case, motor heat may not discharge smoothly through the frame, which may cause the linear motor to be overheated. In some cases, when the compressor is driven, the stator may vibrate due to the gap between the stator and the frame and hitting the frame, which may cause a vibration noise.

In some examples, the gas-lubricated compressor may include an outer stator of the linear motor including a plurality of stator cores that are supported in an axial direction by a frame having a disk shape. In some cases, a valley may be generated between neighboring stator cores due to a blockage by the frame. In this case, a refrigerant flowing in an inner space of the casing may be blocked by the frame, which may increase a flow resistance with respect to the refrigerant, lower a convective heat transfer coefficient, and thereby lower a heat radiation effect.

In some examples, the gas-lubricated compressor may include a compressor main body disposed at a predetermined interval in the inner space of the casing, in which the heat radiation effect for the motor heat and the compression heat generated in the compressor main body may be reduced, and thus a size of the compressor may be increased. In some cases, the casing should have a different size according to a standard of the compressor main body, which may result in an increase of a fabricating cost.

SUMMARY

This application describes a linear compressor, capable of preventing a cylinder or a piston from being overheated by way of quickly radiating heat generated in a driving unit or a compression unit, and accordingly reducing a generation of a suction loss or a compression loss due to overheat of a refrigerant introduced.

This application also describes a linear compressor, capable of quickly radiating motor heat or compression heat by allowing motor heat transferred to a stator to be moved smoothly to a frame.

This application also describes a linear compressor, capable of preventing a refrigerant flowing in an inner space of a casing from being blocked by a frame, so as to reduce flow resistance of the refrigerant and increase a convective heat transfer coefficient of the refrigerant accordingly.

This application also describes a linear compressor, capable of quickly radiating motor heat and compression heat by minimizing a gap between a compressor main body and a member supporting the compressor main body.

This application further describes a linear compressor, capable of quickly radiating motor heat or compression heat and simultaneously suppressing vibration noise by way of increasing a contact force between a compressor main body and a member supporting the compressor main body.

This application further describes a linear compressor, capable of reducing a size thereof and commonly using a supporting structure regardless of a standard of a compressor main body.

According to one aspect of the subject matter described in this application, a linear compressor includes a cylinder that defines a compressor space and that is configured to compress refrigerant in the compressor space, a piston located in the cylinder and configured to perform a reciprocating motion in an axial direction relative to the cylinder, a mover coupled to the piston and configured to transmit a driving force to the piston to cause the piston to perform the reciprocating motion, a stator that defines a cylinder space that receives the cylinder, in which the stator is configured to generate the driving force together with the mover, and a supporting unit that includes an overlap portion that covers at least a portion of the stator, that is coupled to the stator, and that contacts the stator.

Implementations according to this aspect may include one or more of the following features. For example, the supporting unit may include a frame that faces a side surface of the stator in the axial direction and that supports the stator in the axial direction, and the frame may include at least one heat radiating portion that extends along the stator in the axial direction. In some examples, at least a part of the heat radiating portion is located radially inward of an outer circumference of the stator. In some examples, the stator may include a plurality of stator cores that are stacked radially and that are arranged at intervals in a circumferential direction, and the at least one heat radiating portion extends along an interval between the plurality of stator cores.

In some implementations, the at least one heat radiating portion has side surfaces that face the plurality of stator cores in the circumferential direction, and at least one of the side surfaces contacts a side surface of the plurality of stator cores in the circumferential direction. In some examples, the at least one heat radiating portion defines a heat radiation hole that extends from an inner circumferential surface of the heat radiating portion to an outer circumferential surface of the heat radiating portion. In some examples, the at least one heat radiating portion has side surfaces that face the plurality of stator cores in the circumferential direction, and at least one of the side surfaces is spaced apart from a side surface of the plurality of stator cores in the circumferential direction.

In some implementations, the linear compressor may further include a stator cover that is located at an opposite side of the frame with respect to the stator, that is configured to support the stator in the axial direction, and that contacts the at least one heat radiating portion. In some examples, the at least one heat radiating portion defines a coupling hole that extends in the axial direction and that is configured to receive a coupling bolt configured to couple the frame to the stator cover. In some implementations, the linear compressor may further include a casing that defines a hermetic inner space, the casing having an inner circumferential surface that is spaced apart from an outer circumferential surface of the stator.

In some implementations, the supporting unit may include a housing that has an inner surface that defines a hermetic inner space, in which the stator is inserted into the hermetic inner space and faces the inner surface of the housing. In some examples, the linear compressor further includes a heat transfer member located between an outer surface of the stator and the inner surface of the housing, in which a thermal conductivity coefficient of the heat transfer member is greater than a thermal conductivity coefficient of the stator or a thermal conductivity coefficient of the housing. In some examples, the housing may include a first housing that surrounds an outer circumferential surface of the stator, a second housing that is coupled to a first end portion of the first housing and that faces one side surface of the stator in the axial direction, and a third housing that is coupled to a second end portion of the first housing. In this or other examples, the heat transfer member is located at least one of (i) a first position between an inner circumferential surface of the first housing and the outer circumferential surface of the stator or (ii) a second position between the second housing and the one side surface of the stator.

In some examples, the stator may include a plurality of stator cores that are arranged in a circumferential direction, in which each of the plurality of stator cores includes a plurality of lamination sheets that are stacked in the circumferential direction and that define a curved shape. In this or other examples, the inner surface of the housing includes a first portion that defines a stator insertion groove that contacts an outer circumferential surface of the plurality of stator cores, and a second portion that is located outside of the stator insertion groove in the circumferential direction, where a curvature of the stator insertion groove is greater than a curvature of the second portion of the inner surface of the housing.

In some implementations, the stator may include a plurality of stator cores that are arranged in a circumferential direction, in which each of the plurality of stator cores includes a plurality of lamination sheets that are stacked in the circumferential direction and that define a curved shape. The supporting unit may include at least one heat radiating portion that faces the inner surface of the housing and that is located between the plurality of the stator cores.

In some implementations, the stator may include a plurality of stator cores that are arranged in a circumferential direction and that are spaced apart from one another in the circumferential direction, where wherein the heat transfer member includes a plurality of first portions arranged in the circumferential direction corresponding to the plurality of stator cores, each of the first portions facing an outer surface of one of the plurality of stator cores.

In some examples, the stator may include a plurality of stator cores that are arranged in a circumferential direction and that are spaced apart from one another in the circumferential direction, where the heat transfer member may include a first portion having a cylindrical shape that surrounds the plurality of stator cores in the circumferential direction.

According to another aspect, a linear compressor includes a cylinder that defines a compressor space and that is configured to compress refrigerant in the compressor space, a piston located in the cylinder and configured to perform a reciprocating motion in an axial direction relative to the cylinder, a stator that receives the cylinder and that is configured to generate force to drive the piston to perform the reciprocating motion, where the stator includes a plurality of stator cores arranged in a circumferential direction about an axis of the stator, and a supporting unit that covers at least a portion of the stator, that is coupled to the stator, and that is configured to support the stator in the axial direction.

Implementations according to this aspect may include one or more of the following features or the features described above. For example, the supporting unit may include a plurality of heat radiation portions that are located at intervals between the plurality of stator cores and that extend in the axial direction, where at least a portion of the plurality of heat radiation portions protrudes radially outward of an outer circumference of the plurality of stator cores.

In some examples, the supporting unit may include a heat transfer member that extends in the axial direction and that surrounds an outer circumferential surface of one or more of the plurality of stator cores, where a thermal conductivity coefficient of the heat transfer member is greater than a thermal conductivity coefficient of the stator or a thermal conductivity coefficient of the supporting unit.

In some implementations, a member for supporting a stator of a linear motor can be coupled to the stator in a contact manner, thereby rapidly radiating motor heat transferred through the stator.

In some implementations, since a heat radiating portion brought into contact with a frame is formed by extending from the frame or between the frame and a stator cover spaced apart from the frame by a predetermined interval, the frame can be quickly cooled so as to prevent a cylinder or piston from being overheated. This may result in reduction of a suction loss or compression loss caused due to overheating of an introduced refrigerant.

Further, since a flow barrier between a stator and a frame or the stator and a stator cover is removed by being filled with a heat radiating portion therein, a refrigerant can smoothly flow in an inner space of a casing and thus a convective heat transfer coefficient of the refrigerant can be increased, thereby enhancing a heat transfer effect between a compressor main body and the casing.

In some implementations, by inserting a heat transfer member having a high thermal conductivity coefficient between a frame and a stator brought into contact with the frame, motor heat can smoothly move to the frame through the stator to be quickly radiated, thereby improving compressor efficiency.

In some implementations, a housing surrounding a compressor main body may be exposed to outside, which may allow motor heat and compression heat generated in the compressor main body to be rapidly radiated.

In some implementations, since a heat transfer member is provided between a compressor main body and a housing, heat generated in the compressor main body can be radiated by being quickly transferred to the housing. Also, the heat transfer member can have elasticity so as to reduce vibration noise generated between the compressor main body and the housing.

In some implementations, a compressor main body can be enclosed by a housing in a manner that the housing is exposed to outside, thereby reducing a size of a compressor and simultaneously simplifying a structure of a support bracket for supporting the compressor. This may allow a supporting structure to be commonly used regardless of a standard of the compressor main body.

DETAILED DESCRIPTION

Description will now be given in detail of a linear compressor according to exemplary implementations disclosed herein, with reference to the accompanying drawings.

Figure 1:
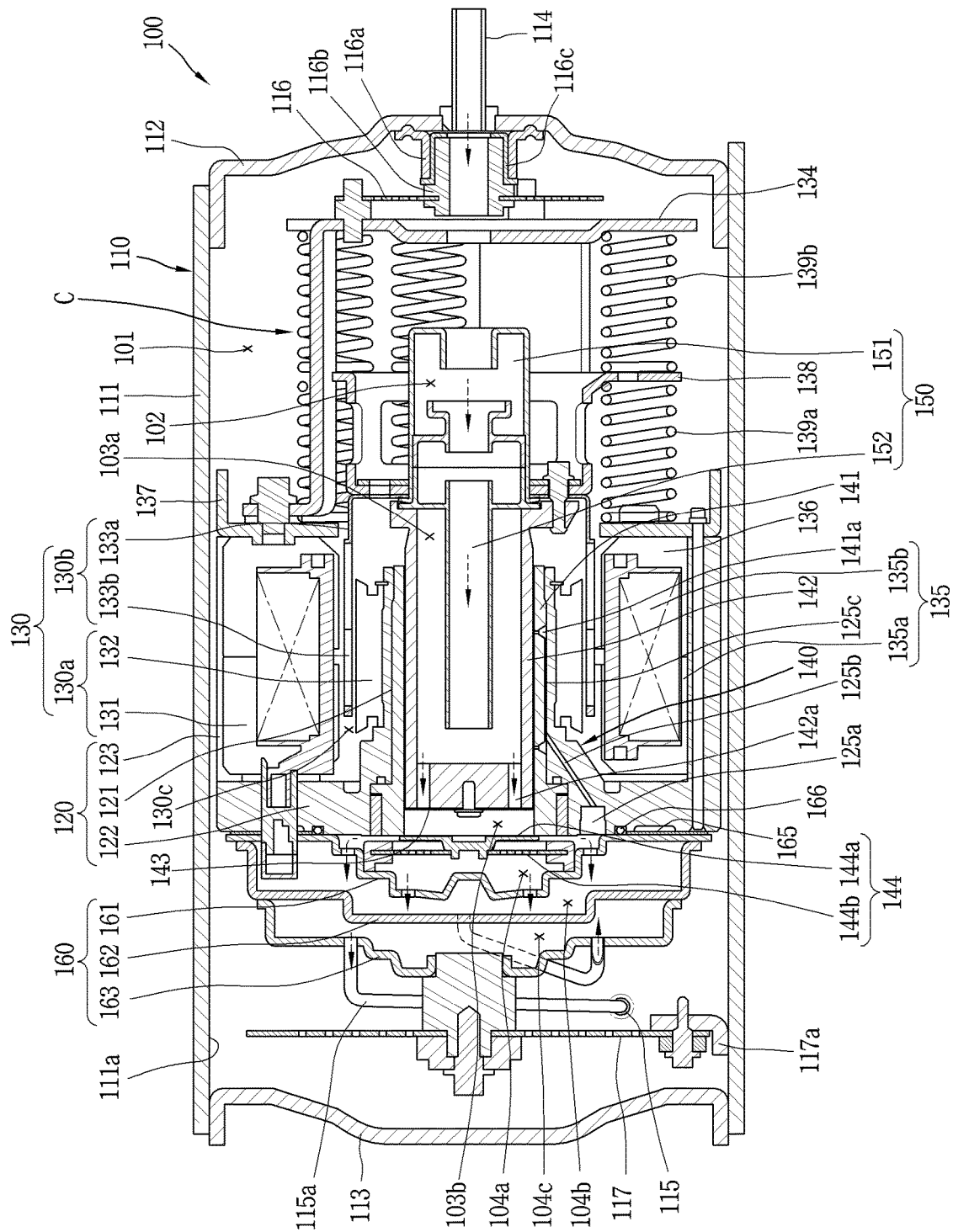
FIG. 1 is a longitudinal sectional view of an example linear compressor.

A linear compressor may perform an operation of suctioning and compressing a fluid and discharging the compressed fluid. A linear compressor according to the present disclosure may be a component of a refrigeration cycle. Hereinafter, description will be given of an example in which a fluid is a refrigerant circulating in a refrigeration cycle. FIG. 1 is a longitudinal sectional view of a linear compressor in accordance with the present disclosure.

Referring to FIG. 1, a linear compressor 100 according to an implementation of the present disclosure includes a casing 110 having an inner space 101 forming a hermetic space, and a frame 120 provided in the inner space 101 of the casing 110 and elastically supported by supporting springs 116, 117 to be explained later. The frame 120 is one example of a supporting unit for supporting a driving unit 130 which is a linear motor. The driving unit 130, which is the linear motor, is supportedly coupled to the frame 120. The driving unit 130 is coupled with a compression unit 140 that suctions, compresses, and discharges a refrigerant. Accordingly, the compression unit 140 may be coupled to the frame 120 together with the driving unit 130 so as to be elastically supported with respect to the casing 110.

The casing 110 may be formed of a thermally conductive material. Accordingly, heat generated in the inner space 101 of the casing 110 can be radiated to outside through the casing 110.

The casing 110 may include a shell 111 having both ends opened and formed in a cylindrical shape substantially long in a horizontal direction, a first shell cover 112 coupled to a rear side of the shell 111, and a second shell cover 113 coupled to a front side of the shell 111. Accordingly, the casing may lay along a horizontal direction. In the drawing, the first shell cover 112 may be coupled to a right side of the shell 111 and the second shell cover 113 may be coupled to a left side of the shell 111. In a broad sense, the first shell cover 112 and the second shell cover 113 may form a part of the shell 111.

An inner diameter of the shell 111 may vary according to a size of the driving unit 130. However, since the linear compressor 100 according to this implementation excludes an oil bearing and uses a gas bearing, the inner space 101 of the casing 110 does not have to be filled with oil. Therefore, the shell 111 may be formed to have an inner diameter as small as possible, for example, formed to have an interval from the frame 120 so that a flange portion 122 of the frame 120 to be explained later is not in contact with an inner circumferential surface 111a of the casing 110. Accordingly, in the linear compressor 100 according to this implementation, an outer diameter of the shell 111 may be formed to be very small as compared with the aforementioned Patent Document 1.

The first shell cover 112, as aforementioned, is coupled to the shell 111 to seal the rear side of the shell 111. A suction pipe 114 may be inserted into the first shell cover 112.

A suction side support member 116a which is formed in a cylindrical shape may be coupled to an inner circumferential surface of the first shell cover 112. A first support spring 116 which is configured as a leaf spring may be fixedly coupled to the suction side support member 116a. A suction guide 116b may be inserted into the suction side support member 116a. A central portion of the first support spring 116 may be coupled to the suction guide 116b while an edge of the first support spring 116 may be coupled to a back cover 134 to be described later. Accordingly, a rear side of a compressor main body C including the back cover 134 can be elastically supported on the casing 110 including the first shell cover 112 by the first support spring 116 in a radial direction.

Here, the suction guide 116b is formed in a cylindrical shape and communicates with the suction pipe 114 so that a refrigerant suctioned through the suction pipe 114 flows through the suction guide 116b to be smoothly introduced into a suction muffler assembly 150 which will be explained later.

A damping member 116c made of rubber or the like may be provided between the suction side support member 116a and the suction guide 116b. Accordingly, it is possible to prevent vibration, which may be generated during the suction of the refrigerant through the suction pipe 114, from being transferred from the suction guide 116b to the suction side support member 116a.

The second shell cover 113, as aforementioned, is coupled to the shell 111 so as to seal the front side of the shell 111, and a discharge pipe 115 which is connected to a loop pipe 115a may be inserted into the second shell cover 113. Accordingly, a refrigerant discharged from a compression space 103b may flow through a discharge cover assembly 160, which will be described later, and is discharged to a refrigeration cycle through the loop pipe 115a and the discharge pipe 115.

A discharge side support member 117a may be coupled to an inner surface of the second shell cover 113 or an inner circumferential surface of the shell 111 with which the inner surface of the second shell cover 113 is in contact, and a second support spring 117 which is configured as a leaf spring may be coupled to the discharge side support member 117a.

Accordingly, the front side of the compressor main body C including the discharge cover assembly 160 to be described later may be elastically supported on the casing 110 including the second shell cover 113 by the second support spring 117 in a radial direction.

In some implementations, the frame 120 constituting a part of the compressor main body C is provided in the casing 110. A motor assembly which is configured as the driving unit 130 and a cylinder 141 which constitutes a part of the compression unit 140 may be supportedly coupled to the frame 120. Accordingly, the frame 120 may be elastically supported, together with the driving unit 130 and the compression unit 140, with respect to the casing 110 by the first support spring 116 and the second support spring 117.

The frame 120 may include a body portion 121, a flange portion 122, and a heat radiating portion 123. The heat radiating portion 123 will be described later.

The body portion 121 may be formed in a cylindrical shape. An inner stator 132 to be described later may be coupled to an outer circumferential surface of the body portion 121 and a cylinder 141 may be coupled to an inner circumferential surface of the body portion 121, respectively. An outer stator 131 to be described later may be coupled to a rear surface of the flange portion 122 and a discharge cover assembly 160 to be described later may be coupled to a front surface of the flange portion 122, respectively.

The flange portion 122 may extend radially from a front end of the body portion 121. A bearing inlet groove 125a which forms a part of a gas bearing to be explained later may be formed on one side of the front surface of the flange portion 122, and a bearing communication hole 125b may be formed from the bearing inlet groove 125a to an inner circumferential surface of the body portion 121 in a penetrating manner. A bearing communication groove 125c may be formed on the inner circumferential surface of the body portion 121 to communicate with the bearing communication hole 125b.

The bearing inlet groove 125a may be recessed by a predetermined depth in an axial direction, and the bearing communication hole 125b which is a hole having a smaller sectional area than the bearing inlet groove 125a may be formed inclined toward the inner circumferential surface of the body portion 121. The bearing communication groove 125c may be formed in an annular shape having predetermined depth and axial length on the inner circumferential surface of the body portion 121. Alternatively, the bearing communication groove 125c may be formed on an outer circumferential surface of the cylinder 141 which is in contact with the inner circumferential surface of the body portion 121 or a half of the bearing communication groove 125c may be formed on the inner circumferential surface of the body portion 121 and the other half may be formed on the outer circumferential surface of the cylinder 141.

The cylinder 141 may be provided with a bearing hole 141a at a position corresponding to the bearing communication groove 125c. The bearing hole 141a may be one example of a nozzle part in a gas bearing. This will be described again when explaining the cylinder.

The driving unit 130 may include a stator 130a, and a mover 130b reciprocating with respect to the stator 130a.

The stator 130a may include an outer stator 131 fixed to the flange portion 122 of the frame 120, and an inner stator 132 disposed inside the outer stator 131 by a predetermined gap from the outer stator 131. The inner stator 132 may be inserted to the outer circumferential surface of the body portion 121 so as to surround the body portion 121 of the frame 120.

The outer stator 131 may include a coil winding body 135, and stator cores 136 stacked to surround the coil winding body 135, and the coil winding body 135 may include a bobbin 135a and a coil 135b wound around the bobbin 135a in a circumferential direction of the bobbin 135a. A cross section of the coil 135b may be in a circular or polygonal shape, and may have a hexagonal shape, for example.

Figure 3:
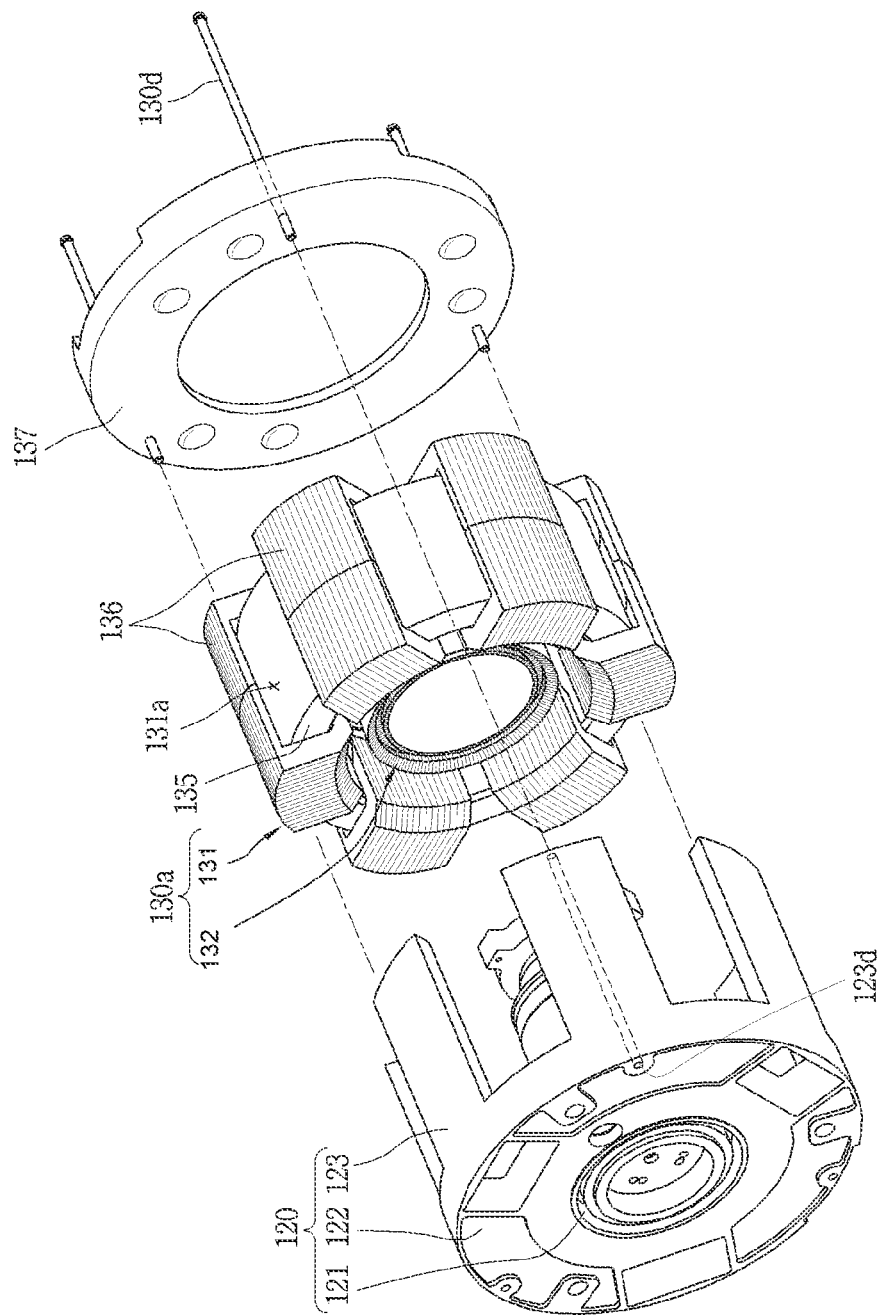
FIG. 3 is an exploded perspective view of the driving unit of FIG. 2.

The stator cores 136 may be formed by stacking a plurality of lamination sheets radially. Alternatively, as illustrated in FIG. 3, the stator cores 136 may be formed in a manner that a plurality of lamination sheets are stacked into a plurality of lamination blocks each having the same curvature on inner and outer circumferential surfaces and the plurality of lamination blocks are arranged along a circumferential direction.

A stator cover 137 may be provided on another side of the outer stator 131. Accordingly, one side of the outer stator 131 can be supported by the frame 120, and the another side can be supported by the stator cover 137, respectively.

The inner stator 132 may be fixedly inserted to an outer circumferential surface of the frame 120. The inner stator 132 may be formed by radially stacking a plurality of lamination sheets.

In some implementations, the mover 130b may be provided with a magnet holder 133a and a magnet 133b supported by the magnet holder 133a. The magnet holder 133a may be formed in a cylindrical shape. One end of the magnet holder 133a may be coupled to a piston 142 to be explained later and another end of the magnet holder 133a may be reciprocally inserted into a gap between the outer stator 131 and the inner stator 132.

The magnet 133b may be adhesively fixed to an outer circumferential surface of the magnet holder 133a or may be fixed thereto using a separate fixing ring. Accordingly, the magnet 133b can reciprocate linearly together with the magnet holder 133a by a mutual electromagnetic force generated between the outer stator 131 and the inner stator 132.

Also, a spring supporter 138 may be coupled to another end of the magnet holder 133a together with the piston 142. The spring supporter 138 may be provided at its both sides with a first resonance spring 139a and a second resonance spring 139b for resonating the mover 130b of the driving unit 130 and the piston 142 of the compression unit 140.

Here, the first resonance spring 139a may be disposed between a rear surface of the stator cover 137 and a front surface of the spring supporter 138, and the second resonance spring 139b may be disposed between a rear surface of the spring supporter 138 and a front surface of the back cover 134, respectively. The back cover 134 may be coupled to the stator cover 137 so as to support another end of the second resonance spring 139b in an axial direction, as described above. Accordingly, the mover 130b of the driving unit 130 and the piston 142 of the compression unit 140 may linearly reciprocate along the axial direction by an electromagnetic force of the driving unit 130 and an elastic force of the resonance springs 139a, 139b. During the reciprocation, a refrigerant can be suctioned into a compression space 103b, compressed in the compression space 103b and then discharged from the compression space 103b.

In some implementations, the compression unit 140 may include a cylinder 141, a piston 142, a suction valve 143, and a discharge valve assembly 144.

The cylinder 141 may be formed in a cylindrical shape so as to have a compression space 103b therein and may be fixedly inserted into an inner circumferential surface of the frame 120. A suction muffler assembly 150 to be described later through which a refrigerant is suctioned into the compression space 103b may be provided at the to rear of the cylinder 141, and a discharge cover assembly 160 to be explained later through which a refrigerant compressed in the compression space 103b is discharged may be provided at the front of the cylinder 141.

The remaining part of the gas bearing for supplying discharged gas to a gap or space between the cylinder 141 and the piston 142 to lubricate the gap or space between the cylinder 141 and the piston with the gas may be formed in the cylinder 141. For example, the cylinder 141 may be provided with a bearing hole 141a formed therethrough in a radial direction at a position communicating with the bearing communication groove 125c, so as to guide a compressed refrigerant introduced into the bearing communication groove 125c toward an inner circumferential surface of the cylinder 141 and an outer circumferential surface of the piston 142. Of course, as described above, the bearing communication groove 125c may be formed on the outer circumferential surface of the cylinder 141, from the machining perspective.

The bearing hole 141a may have an inlet formed wide and an outlet formed as a fine through hole to play a role as a nozzle. A filter for blocking an introduction of foreign substances may be provided in an inlet portion of the bearing hole 141a. The filter may be a mesh filter made of a metal or may be formed by winding a member such as a thin thread. Accordingly, the inlet and outlet of the bearing hole 141a may be formed independently so as to communicate with each other, or the inlet may be formed as an annular groove and the outlet may be formed in plurality at predetermined intervals along the annular groove.

The bearing hole 141a may be formed only at a side (hereinafter, referred to as a front side) adjacent to the compression space 103b with respect to a middle portion of the cylinder 141 in an axial direction, or may be formed even at an opposite rear side in consideration of sagging of the piston 142.

The piston 142 may have a suction flow path 103a therein, and may be formed in a cylindrical shape having a front end partially opened and a rear end fully opened. As described above, the piston 142 may have the open rear end connected to the magnet holder 133a so as to perform a reciprocating motion together with the magnetic holder 133a.

A suction port 142a communicating the suction flow path 103a with the compression space 103b may be formed on the front end of the piston 142. A suction valve 143 for selectively opening and closing the suction port 142a may be provided on a front surface of the piston 142. Accordingly, a refrigerant suctioned into the inner space 101 of the casing 110 may open the suction valve 143 so as to flow into the compression space 103b in the cylinder 141 through the suction flow path 103a and the suction port 142a of the piston 142.

In some implementations, a discharge valve assembly 144, which opens and closes the compression space 103b, may be detachably provided at the front end of the cylinder 141.

Here, the discharge valve assembly 144 may include a discharge valve 144a, and a valve spring 144b provided on the front of the discharge valve 144a to elastically support the discharge valve 144a. The valve spring 144b may be configured as a compression coil spring, but may alternatively be configured as a leaf spring in consideration of an occupied space or reliability.

Thus, when pressure in the compression space 103b becomes equal to or higher than discharge pressure, the valve spring 144b is deformed forward to open the discharge valve 144a. A refrigerant is then discharged from the compression space 103b and flows into a first discharge space 104a of a discharge cover assembly 160 to be explained later. When the discharge of the refrigerant is completed, the valve spring 144b provides a restoring force to the discharge valve 144a so that the discharge valve 144a is closed.

In some implementations, a suction muffler assembly 150 may be coupled to the rear end of the piston 142 to attenuate noise generated during suction of a refrigerant.

Here, the suction muffler assembly 150 may include a suction muffler 151 communicating with the inner space 101 of the casing 110, and an inner guide 152 connected to one side of the suction muffler 151 to guide a refrigerant to the suction port 142a.

The suction muffler 151 may be provided outside the piston 142, and form a plurality of noise spaces 102 therein by baffles. The suction muffler 151 may be formed of a metal but may alternatively be formed of a plastic material in consideration of weight and insulation.

The inner guide 152 may be formed in a pipe shape so as to communicate with the noise spaces of the suction muffler 151 and may be inserted deeply into the suction flow path 103a of the piston 142. The inner guide 152 may be formed in a cylindrical shape having the same inner diameters at both front and rear ends, but in some cases, an inner diameter of the front end which is a discharge side of the inner guide 152 may be formed larger than an inner diameter of the opposite rear end.

In some implementations, a discharge cover assembly 160 for attenuating noise generated during discharge of a refrigerant from the compression space 103b may be coupled to the front surface of the frame 120.

Here, the discharge cover assembly 160 may be provided at the front side of the cylinder in a manner of accommodating the discharge valve assembly 144 therein. To this end, the discharge cover assembly 160 may be fixedly coupled to a front surface of the flange portion 122, which constitutes a part of the frame 120. A gasket 165 for insulation and an O-ring 166 for preventing a leakage of a refrigerant from the first discharge space 104a may be provided between the discharge cover assembly 160 and the frame 120.

The discharge cover assembly 160 may be formed of a thermally conductive material. Accordingly, when a refrigerant of high temperature is introduced into the discharge cover assembly 160, heat contained in the refrigerant may be transferred to the casing 110 through the discharge cover assembly 160 so as to be radiated to the outside of the compressor.

The discharge cover assembly 160 may be provided with a single discharge cover or may be provided with a plurality of discharge covers arranged to sequentially communicate with one another. This implementation exemplarily illustrates a case where there are three discharge covers.

The discharge cover assembly 160 may include a first cover 161, a second cover 162, and a third cover 163. The first cover 161 may be coupled to the frame 120, the second cover 162 may be coupled to a front side of the first cover 161, and the third cover 163 may be coupled to a front side of the second cover 162. A first discharge space 104a may be formed in the first cover 161, a second discharge space 104b may be formed in the second cover 162, and a third discharge space 104c may be formed in the third cover 163.

The first discharge space 104a may selectively communicate with the compression space 103b by the discharge valve 144a, the second discharge space 104b may communicate with the first discharge space 104a, and the third discharge space 104c may communicate with the second discharge space 104b. Accordingly, a refrigerant discharged from the compression space 103b may move sequentially along the first discharge space 104a, the second discharge space 104b, and the third discharge space 104c. During the movement, discharge noise may be attenuated from the refrigerant. The refrigerant may then be discharged out of the case 110 through a loop pipe 115a and a discharge pipe 115 to be explained later.

Figure 2:
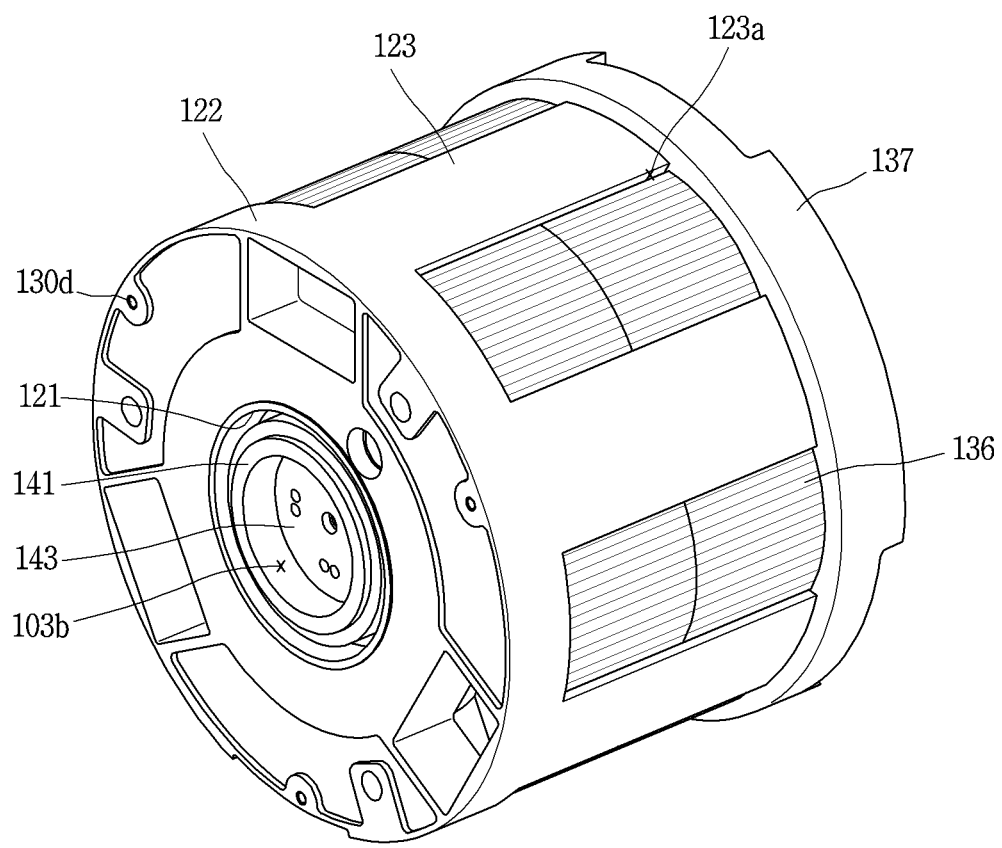
FIG. 2 is a perspective view illustrating an example driving unit in the linear compressor of FIG. 1.

Referring to FIGS. 2 and 3, the linear compressor may include a coupling bolt 130d for coupling the frame and the stator cover.

The linear compressor according to this implementation of the present disclosure may operate as follows.

That is, when a current is applied to the coil 135b of the driving unit 130, a magnetic flux is formed between the outer stator 131 and the inner stator 132. The magnetic flux generates an electromagnetic force. Accordingly, the mover 133, which is provided with the magnet holder 133a and the magnet 133b, linearly reciprocates in a gap between the outer stator 131 and the inner stator 132.

Then, the piston 142 connected to the magnet holder 133a reciprocates linearly in the cylinder 141, so that a volume of the compression space 103b is increased or decreased. At this time, when the piston 142 is moved backward and the volume of the compression space 103b is increased accordingly, the suction valve 143 is opened so that a refrigerant in the suction flow path 103a is introduced into the compression space 103b. In some implementations, when the piston 142 is moved forward and the volume of the compression space 103b is decreased accordingly, the piston 142 compresses the refrigerant in the compression space 103b. The compressed refrigerant opens the discharge valve 144a and is discharged into the first discharge space 104a.

A part of the refrigerant discharged into the first discharge space 104a is supplied between an inner circumferential surface of the cylinder 141 and an outer circumferential surface of the piston 142 through the bearing hole 141a of the cylinder 141 via the bearing inlet groove 125a, the bearing communication hole 125b, and the bearing communication groove 125c of the gas bearing, thereby supporting the piston 142 with respect to the cylinder 141. In some implementations, the remaining refrigerant flows into the second discharge space 104b through the first communication hole 105a, and then flows into the third discharge space 104c through the second communication hole 105b, a connection pipe 106, and the third communication hole 105c. During the flow, noise is attenuated from the refrigerant. The refrigerant moved to the third discharge space 104c is discharged to the outside of the compressor through the loop pipe 115a and the discharge pipe 115 and is then moved to a condenser of a refrigeration cycle. Such series of processes is repeatedly performed.

At this time, motor heat is generated in the driving unit 130, and compression heat is transferred to the discharge cover assembly 160 from the refrigerant discharged from the compression space 103b. The motor heat and the compression heat are transferred to the cylinder 141 and the piston 142 through the frame 120, respectively.

Accordingly, the refrigerant introduced into the compression space 103b of the cylinder 141 as well as the refrigerant introduced into the suction flow path 103a of the piston 142 is heated, which causes a specific volume of the refrigerant to be increased, thereby bringing about a suction loss or a compression loss. This may result in lowering overall efficiency of the compressor.

Particularly, when an oil bearing is applied to a linear compressor, oil having a relatively low temperature may lower a temperature of a compression unit while circulating between the cylinder and the piston. However, as illustrated in this implementation, when a gas bearing other than the oil bearing is applied, a refrigerant of high temperature is introduced between the cylinder and the piston, so as to further increase a temperature of the compression unit. As a result, the temperature of the refrigerant may further rise.

In addition, since the discharge cover assembly is maintained in a high temperature state of about 70° C. by the refrigerant discharged from the compression space to the discharge cover assembly, a temperature of the frame brought into contact with the discharge cover assembly and a temperature of the cylinder brought into contact with the refrigerant stored in the discharge cover assembly may rise as well. Then, the temperature of the refrigerant may further rise, and the compressor efficiency may be lowered.

Figure 4:
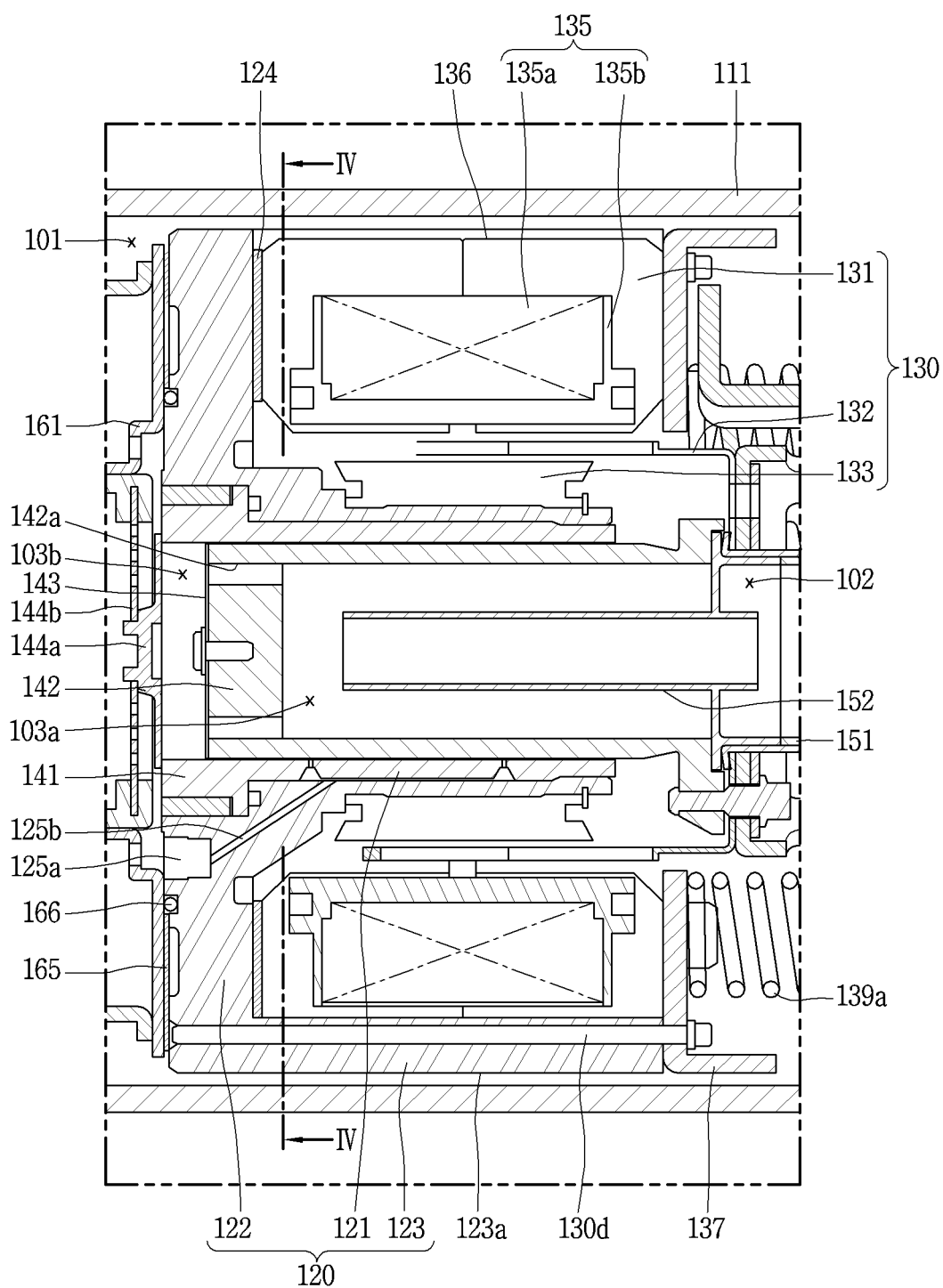
FIG. 4 is a sectional view illustrating an example driving unit and an example compression unit in the linear compressor of FIG. 1.
Figure 5:
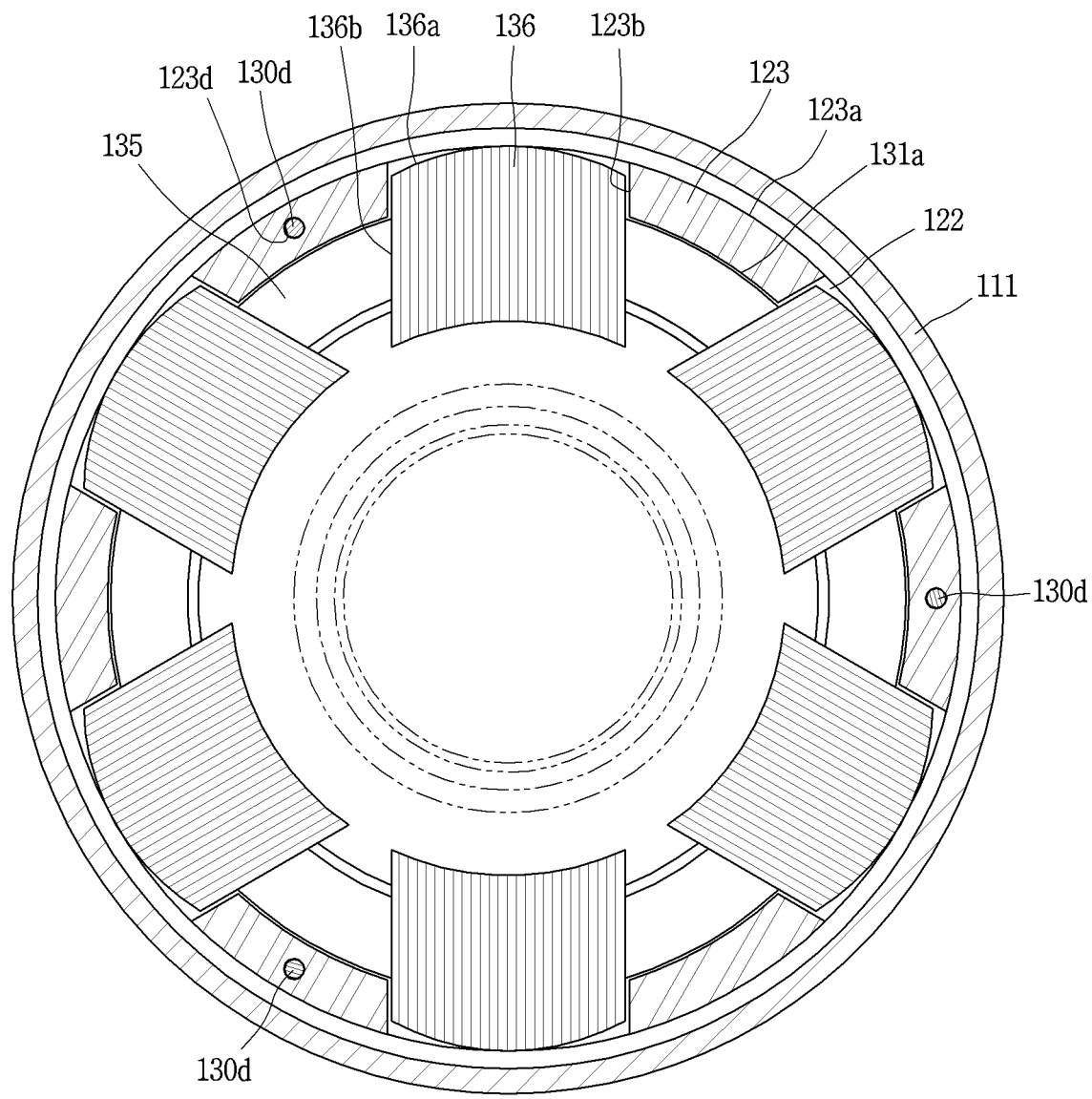
FIG. 5 is a sectional view taken along the line "IV-IV" of FIG. 4.
Figure 6:
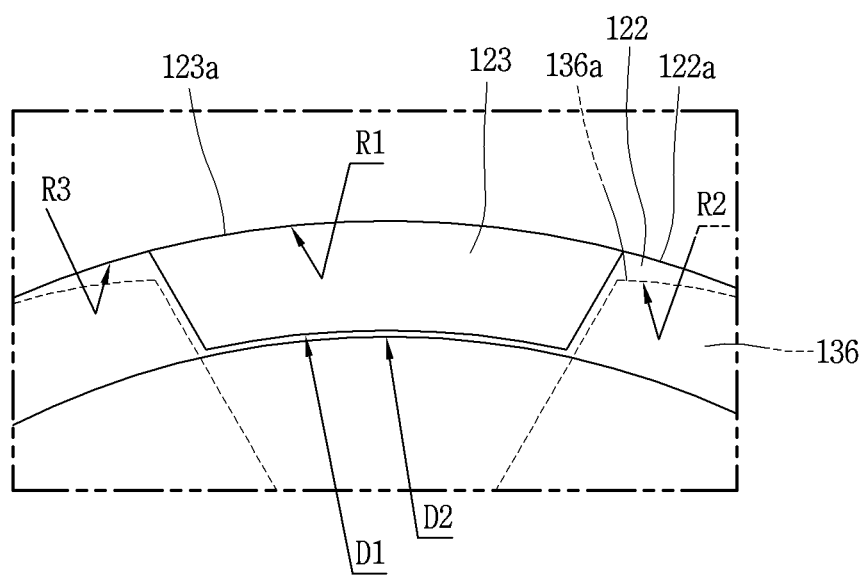
FIG. 6 is a front view illustrating one example of a heat radiating portion of FIG. 5 in an axial direction.

Accordingly, the linear compressor according to the present disclosure may further include a heat radiating portion extending from the flange portion of the frame and connected to the stator cover. Accordingly, in this implementation, a surface area of the frame is enlarged so that heat transferred to the frame can quickly dissipate, thereby preventing heat generated during an operation of the compressor from being transmitted to the compression unit. FIG. 2 is a perspective view illustrating a driving unit in the linear compressor according to FIG. 1, FIG. 3 is an exploded perspective view of the driving unit of FIG. 2, FIG. 4 is a sectional view illustrating a driving unit and a compression unit in the linear compressor according to FIG. 1, FIG. 5 is a sectional view taken along the line "IV-IV" of FIG. 4, and FIG. 6 is a front view illustrating one example of a heat radiating portion of FIG. 5 in an axial direction.

Referring to these drawings, the frame 120 according to this implementation may include the body portion 121, the flange portion 122, and the heat radiating portion 123 as described above. The body portion 121 and the flange portion 122 may be formed in the cylindrical shape and the annular shape, respectively, as described above.

The heat radiating portion 123 may extend in the axial direction from a rear edge of the flange portion 122 toward the stator cover 137. Only one heat radiating portion 123 may be provided. However, the number of heat radiating portions 123 may be the same as the number of stator cores 136 (i.e., the number of core gaps) so that the heat radiating portions 123 can be provided in each space (hereinafter, referred to as the core gap) 131a between the neighboring stator cores 136 forming the outer stator 131.

Each of the heat radiating portions 123 may be formed in the same shape as the core gap 131a. For example, as illustrated in FIGS. 5 and 6, the heat radiating portion 123 may be formed to have a cross-section in a partial fan shape or an arcuate shape when projected in the axial direction. An inner diameter D1 of the heat radiating portion 123 may be greater than or equal to an outer diameter D2 of the coil assembly 135 as the heat radiating portion 123 is inserted and assembled to the outer stator 131 in the axial direction. At this time, the heat radiating portion 123 may be assembled in a manner that its inner circumferential surface is brought into contact with or disposed as close as possible to an outer circumferential surface of the coil winding body 135 (accurately, bobbin), in view of radiating motor heat. A curvature R1 of an outer circumferential surface 123a of the heat radiating portion 123 may be formed to be equal to a curvature R2 of an outer circumferential surface 136a of the stator core 136, but may be the same as a curvature R3 of an outer circumferential surface 122a of the frame 120, in view of facilitating a fabrication and further increasing a surface area.

As the heat radiating portions 123 are formed to correspond to the respective core gaps 131a, both side surfaces of each heat radiating portions 123 in a circumferential direction may be brought into contact with side surfaces 136b of the neighboring stator cores 136. In this case, however, the core gap 131a may be completely sealed by the heat radiating portion 123, and thereby motor heat generated in the linear motor (e.g., driving unit 130) may not be radiated smoothly when the compressor is driven. As a result, the linear motor may be overheated to deteriorate motor efficiency or moisture may be generated so as to lower reliability.

Figure 7:
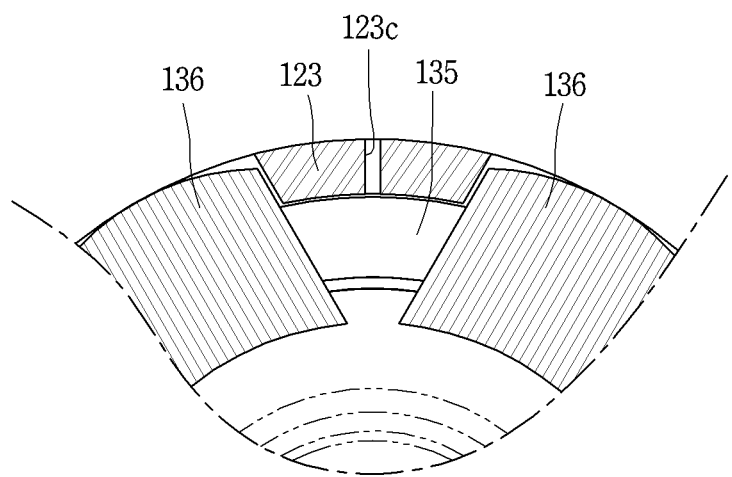
FIGS. 7 and 8 are sectional views illustrating different implementations of a heat radiation passage.
Figure 8:
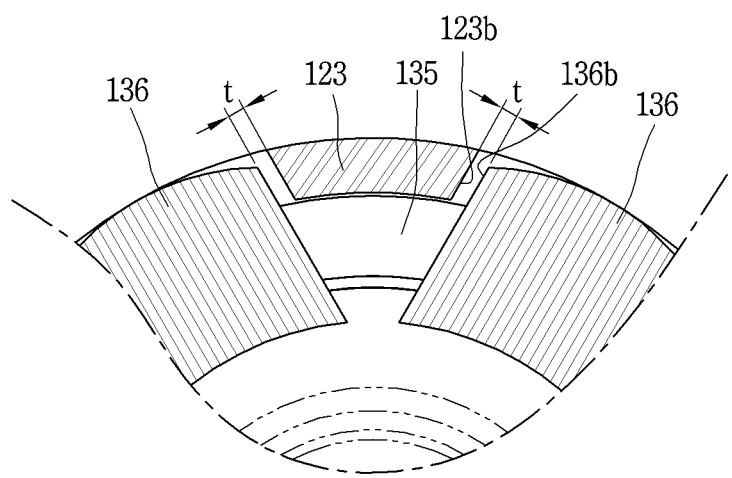

In view of this, in this implementation, a heat radiation passage may be formed in the heat radiating portion or between the heat radiating portion and the stator core. FIGS. 7 and 8 are sectional views illustrating different implementations of a heat radiation passage according to the present disclosure.

As illustrated in FIG. 7, at least one of the plurality of heat radiating portions 123 may include a heat radiation hole 123c. The heat radiation hole 123c may be formed to penetrate from an inner circumferential surface to an outer circumferential surface of the heat radiating portion 123 or may be formed in a radial direction. In addition, one heat radiating portion 123 may be provided with only one heat radiation hole 123c or may be provided with a plurality of heat radiation holes in a lengthwise direction.

A heat radiation passage may also be formed in a form of a heat radiation gap between the heat radiating portion 123 and the stator core 136. For example, as illustrated in FIG. 8, at least one side surface (both side surfaces in the drawing) of both side surfaces 123b of the heat radiating portion 123 may be slightly spaced apart from a side surface 136b of the stator core 136, thereby forming a heat radiation gap t long in the axial direction.

In some implementations, some of the heat radiating portions 123 may be provided with a coupling hole 123d formed therethrough in the axial direction. That is, the frame 120 and the stator cover 137 are coupled to each other using long coupling bolts 130d so as to fixedly support the outer stator 131 located therebetween in the axial direction. At this time, the coupling bolt 130*d* is fixed to the frame 120 and the stator cover 137 at both ends thereof along the core gap 131*a* in the axial direction. However, if the heat radiating portion 123 is inserted in the core gap 131*a* as aforementioned, a space in which the coupling bolt 130*d* can be located may be insufficient. Therefore, in this case, the coupling holes 123*d* may be formed through some of the heat radiating portions 123 in the axial direction, so that the coupling bolts 130*d* can be inserted through the coupling holes 123*d* to couple the frame 120 and the stator cover 137 to each other. Of course, instead of the coupling hole 123*d*, a coupling groove may alternatively be formed on an inner or outer circumferential surface of the heat radiating portion 123, or some of the heat radiating portions 123 may be formed thin by a thickness of the coupling bolt 130*d* so as to ensure respective spaces for inserting the coupling bolts 130*d* without passing through the heat radiating portions.

The heat radiating portion of the linear compressor according to this implementation may provide the following operation effects.

That is, when the compressor is driven, the piston 142 reciprocates in the cylinder 141, so that a refrigerant is compressed in the compression space 103*b* and discharged to the discharge cover assembly 160. The refrigerant discharged to the discharge cover assembly 160 flows toward a refrigeration cycle while sequentially passing through the discharge spaces 104*a*, 104*b* and 104*c* of the first cover 161, the second cover 162 and the third cover 163.

At this time, the first cover 161, in which the refrigerant of the compression space 103*b* is first received, forms the first discharge space 104*a* together with the frame 120, and thus a temperature of the first discharge space 104*a* becomes higher than a temperature of the other discharge spaces 104*b* and 104*c*. Accordingly, the frame 120 may be overheated by the refrigerant of the first discharge space 104*a* or may be overheated by the first cover 161. Also, since a surface area of the frame 120 is limited, the cylinder 141 and the piston 142 may be overheated due to failing to quickly radiate heat of the frame 120, and thereby, as aforementioned, the suction loss or the compression loss of the compressor may be caused.

Figure 9:
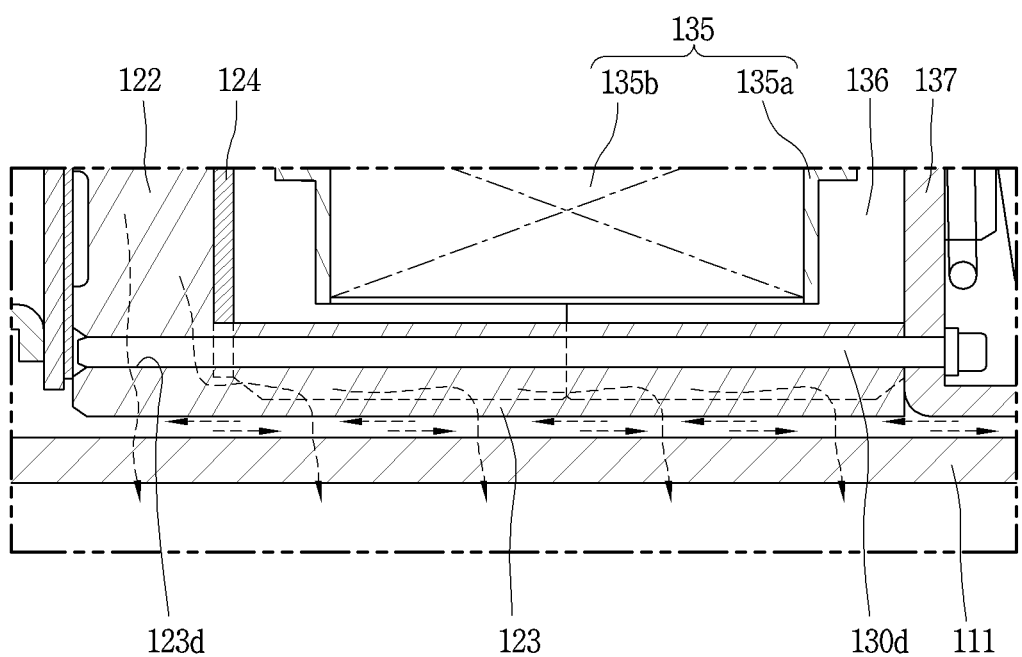
FIG. 9 is a sectional view illustrating heat transfer from an example heat radiating portion to an example casing in an example linear compressor.

In this implementation considering this, the heat radiating portion 123 may extend from the frame 120 so as to increase a surface area of the frame 120, thereby enhancing a heat radiation effect of the frame. FIG. 9 is a sectional view illustrating a movement of heat from a heat radiating portion to a casing in a linear compressor according to the present disclosure.

As illustrated in FIG. 9, even if the frame 120 receives heat from a refrigerant of high temperature accommodated in the discharge cover assembly 160, the surface area of the frame 120 can be increased by forming the plurality of heat radiating portions 123 on the frame 120. Accordingly, heat of the frame 120 can fast be transferred to the casing 110 so that the frame 120 can be effectively cooled. This prevents the heat of the frame 120 from being transmitted to the cylinder 141 or the piston 142 and thus prevents the cylinder 141 and the piston 142 from being overheated. Therefore, the refrigerant in the suction flow path 103*a* or the refrigerant in the compression space 103*b* can be prevented from being overheated, thereby reducing the suction loss or compression loss.

Here, when the heat radiating portion 123 extends from the frame 120 to be in contact with the stator cover 137, the stator cover 137 may also form a heat radiating surface. Therefore, a substantial heat radiation area of the frame 120 can further increase, thereby allowing the frame 120 to be cooled faster.

In the related art, as the core gaps 131*a* form a valley, flow barriers are formed at both ends of each core gap 131*a* by the frame 120 and the stator cover 137, and a refrigerant generates an eddy current due to the flow barriers, which causes an increase in a flow loss of the refrigerant or a reduction of a flow rate of the refrigerant. Accordingly, a convective heat transfer coefficient is reduced and a heat radiation effect for the frame is reduced thereby. However, as illustrated in this implementation of the present disclosure, as the core gap 131*a* is filled with the heat radiating portion 123, the flow barrier of the refrigerant can be removed so as to reduce the flow loss of the refrigerant and improve the flow rate of the refrigerant. This may allow the convective heat transfer coefficient to be increased and the heat radiation effect for the frame to be enhanced accordingly.

Also, as the frame 120 is quickly cooled, the overheat of the cylinder 141 and the piston 142 can be prevented and simultaneously the temperature of the discharge cover assembly 160 which is in contact with the frame 120 can be lowered. Accordingly, the temperature of the refrigerant contained in the discharge space can also be lowered, thereby preventing the frame 120 from being reheated by the refrigerant.

As illustrated in the aforementioned implementation, when the heat radiating portion 123 is formed at the frame 120 to fill the core gap 131*a*, the surface area of the frame 120 can be increased, thereby enhancing the heat radiation effect for the frame. However, as the core gap 131*a* is sealed by the heat radiating portion 123, moisture may be generated on the coil winding body 135 by motor heat. However, as the heat radiation hole 123*c* is formed through the heat radiating portion 123 or the heat radiation gap t is formed between the heat radiating portion 123 and the stator core 136, moisture may not be generated or may be quickly discharged when generated.

In some implementations, in the linear compressor according to the present disclosure, as illustrated in FIG. 4, a heat transfer member 124 may also be inserted between the frame 120 and the outer stator 131. Accordingly, motor heat transferred to the outer stator 131 can be rapidly transferred to the frame 120 by the heat transfer member, and then discharged through the frame 120. At this time, when the heat radiating portion 123 is formed on the frame 120, the motor heat can be discharged more quickly. As a result, overheat of the linear motor can be effectively suppressed and compressor efficiency can be further improved.

Here, the heat transfer member 124 may be formed of a rigid material. However, considering that the outer stator 131 is closely attached to the frame 120 by a coupling force of the coupling bolt 130*d*, the heat transfer member 124 may be formed of an elastic material.

In some implementations, in the foregoing implementation, an end portion of the heat radiating portion 123 is closely attached to the stator cover 137. However, in some cases, the end portion of the heat radiating portion 123 may be spaced apart from the stator cover 137 by a predetermined distance. In this case, since the frame 120 and the stator cover 137 are not integrally connected to each other, the surface area of the frame 120 may become smaller than that in the foregoing implementation. However, in this case, the surface area of the frame 120 can also be enlarged as much as the heat radiating portion 123, and thus the heat radiation effect can be greatly improved as compared with the related art without the heat radiating portion. In addition, in this implementation, since the heat radiating portion 123 is formed short in length, the heat radiation gap may be formed between the heat radiating portion 123 and the stator cover 137. Accordingly, moisture generation due to motor heat can also effectively be suppressed even without forming a separate heat radiation hole through the heat radiating portion.

Figure 10:
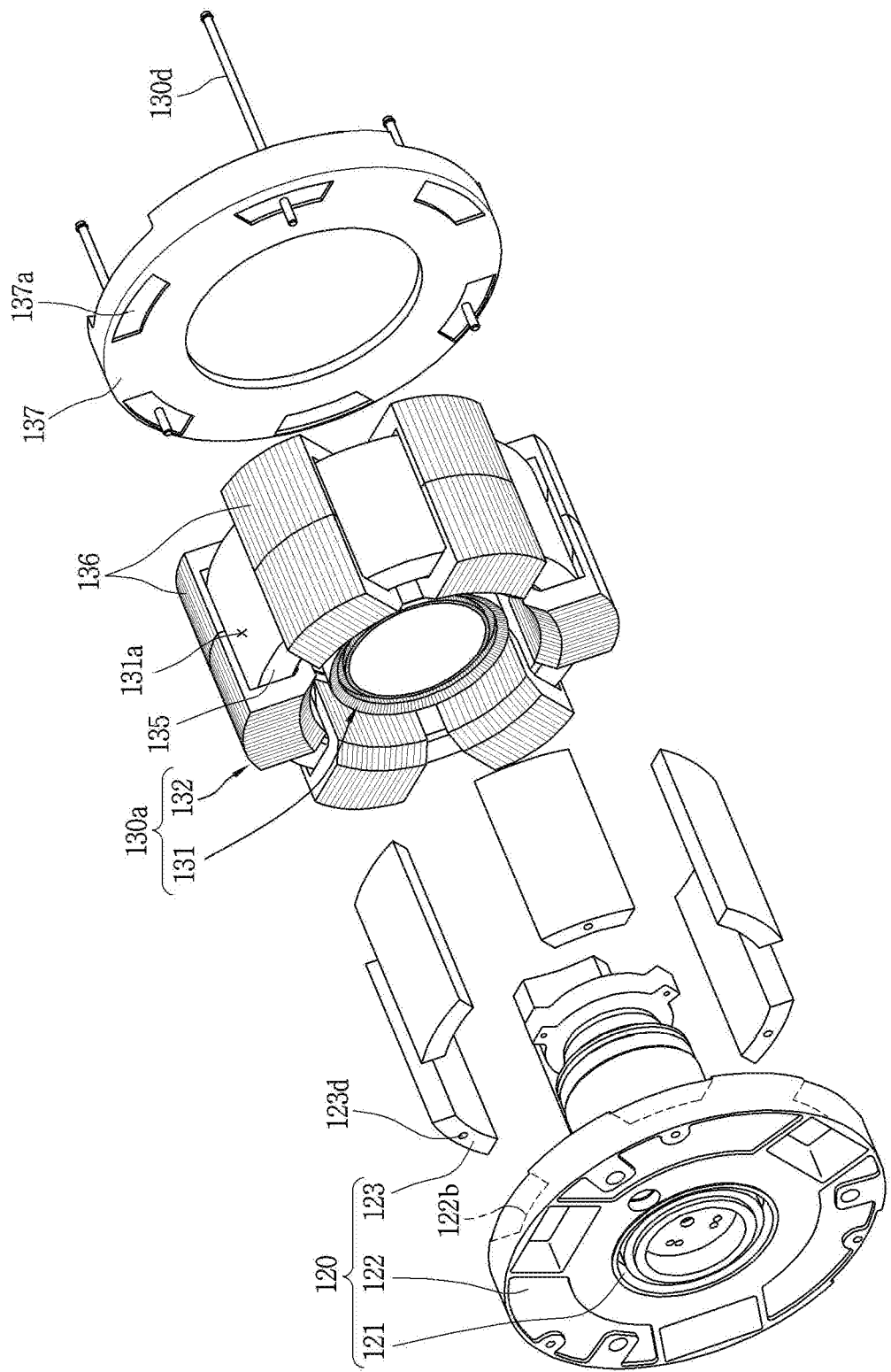
FIG. 10 is a perspective view illustrating another example of an assembly structure of a heat radiating portion in a linear compressor.

In some implementations, the heat radiating portion may be formed by extending from the frame, but in some cases, the heat radiating portion may be separately manufactured and then assembled to the frame, instead of being integrally formed with the frame. FIG. 10 is a perspective view illustrating another implementation of an assembly structure of a heat radiating portion in a linear compressor according to the present disclosure.

As illustrated in FIG. 10, the heat radiating portion 123 is formed to have a cross-section in a partial fan shape or an arcuate shape having a predetermined axial length, and both end surfaces thereof in the axial direction may be attached to the frame 120 and the stator cover 137 in a close contact state or by using the long coupling bolts 130d by which the frame 120 and the stator cover 137 are coupled to each other with the outer stator 131 interposed therebetween. In this case, in order to increase a coupling force of the heat radiating portion 123, support grooves 122b, 137a in which both ends of the respective heat radiating portion 123 can be supportedly inserted may be formed on the flange portion 122 and the stator cover 137 of the frame 120.

Figure 11:
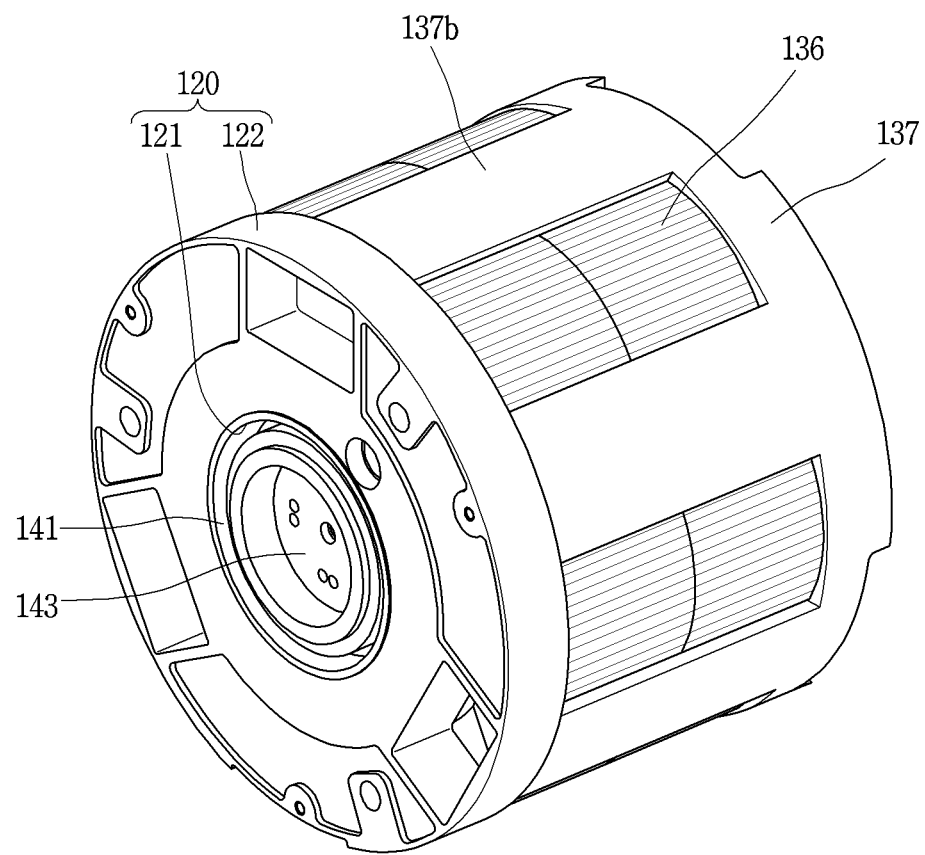
FIG. 11 is a perspective view illustrating an example heat radiating portion that extends from a stator cover.

The heat radiating portion may extend from the frame as illustrated in the foregoing implementation, but may alternatively extend from the stator cover. FIG. 11 is a perspective view illustrating one implementation in which a heat radiating portion extends from a stator cover according to the present disclosure.

As illustrated in FIG. 11, a plurality of heat radiating portions 137b may extend from an edge of a front surface of the stator cover 137 toward a rear surface of the frame 120. In this case as well, the number and shape of the heat radiating portion 137b may be similar to those of the foregoing implementation.

However, in this implementation, a thickness of the stator cover 137 may be thinner than that of the frame 120, and thus a thickness of the heat radiating portion 137b may also be thinner than that in the foregoing implementation. Accordingly, in this implementation, the heat radiating portion 137b may be formed to have an arcuate cross-section rather than a fan-shaped cross-section when projected in the axial direction. The coupling bolt 130d may be coupled along between the heat radiating portion 137b and the coil winding body 135 without passing through the heat radiating portion 137b of the stator cover 137.

In some implementations, the thickness of the stator cover 137 may be the same as or similar to the thickness of the frame 120, or the thickness of the heat radiating portion 137b may be thicker than other portions.

In some implementations, the heat radiating portions 123, 137b may extend from the frame 120 and the stator cover 137, respectively, so that ends of the heat radiating portions 123, 137b may be in contact with each other.

The foregoing implementation has illustrated an example in which a supporting unit including a linear motor is installed in an inner space of a casing. However, even when a linear motor is sealed by a supporting unit without a casing, fast radiation of heat generated in the linear motor may greatly affect improvement of performance of a compressor.

Figure 12:
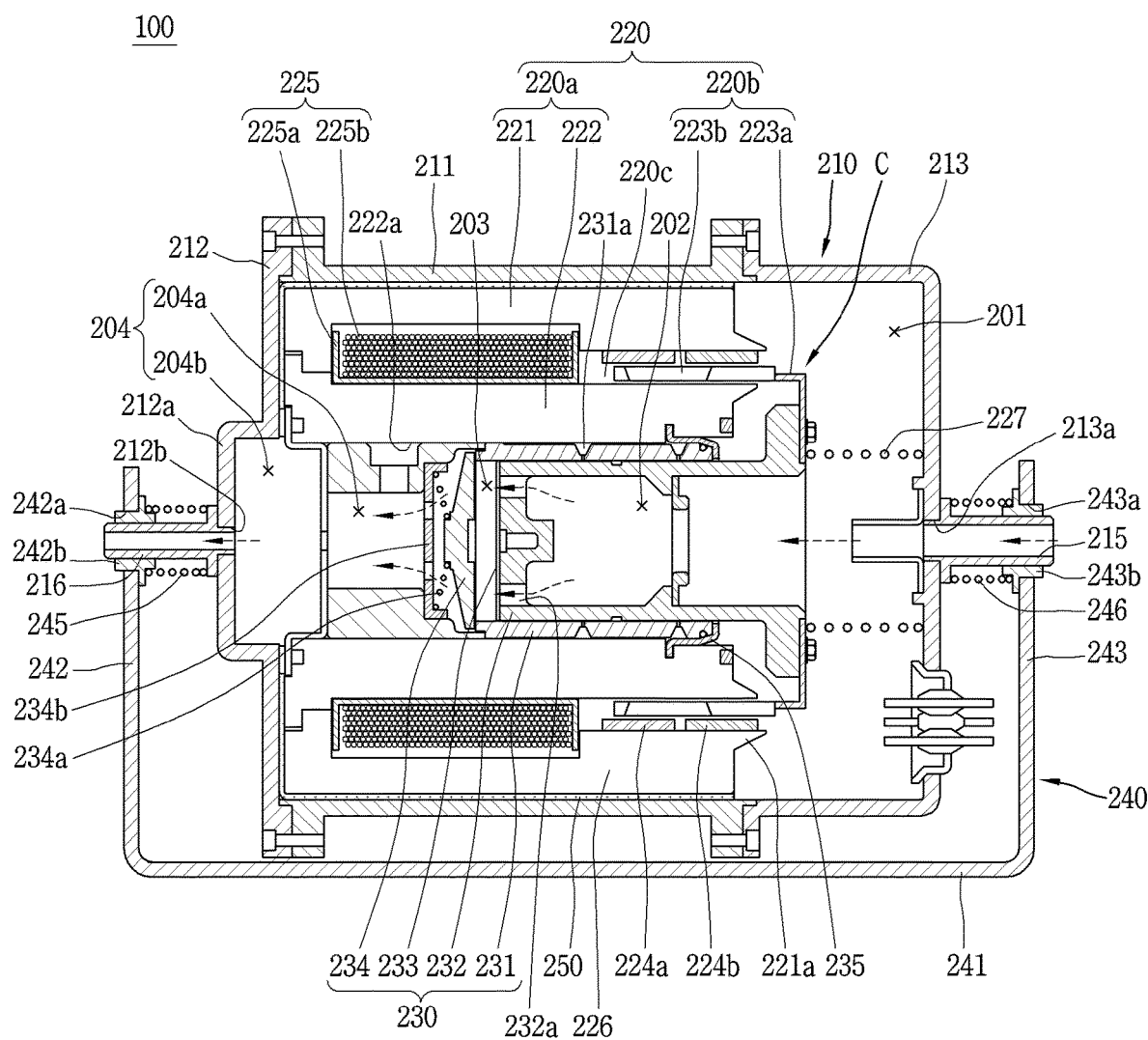
FIG. 12 is a sectional view illustrating another example of a linear compressor.
Figure 13:
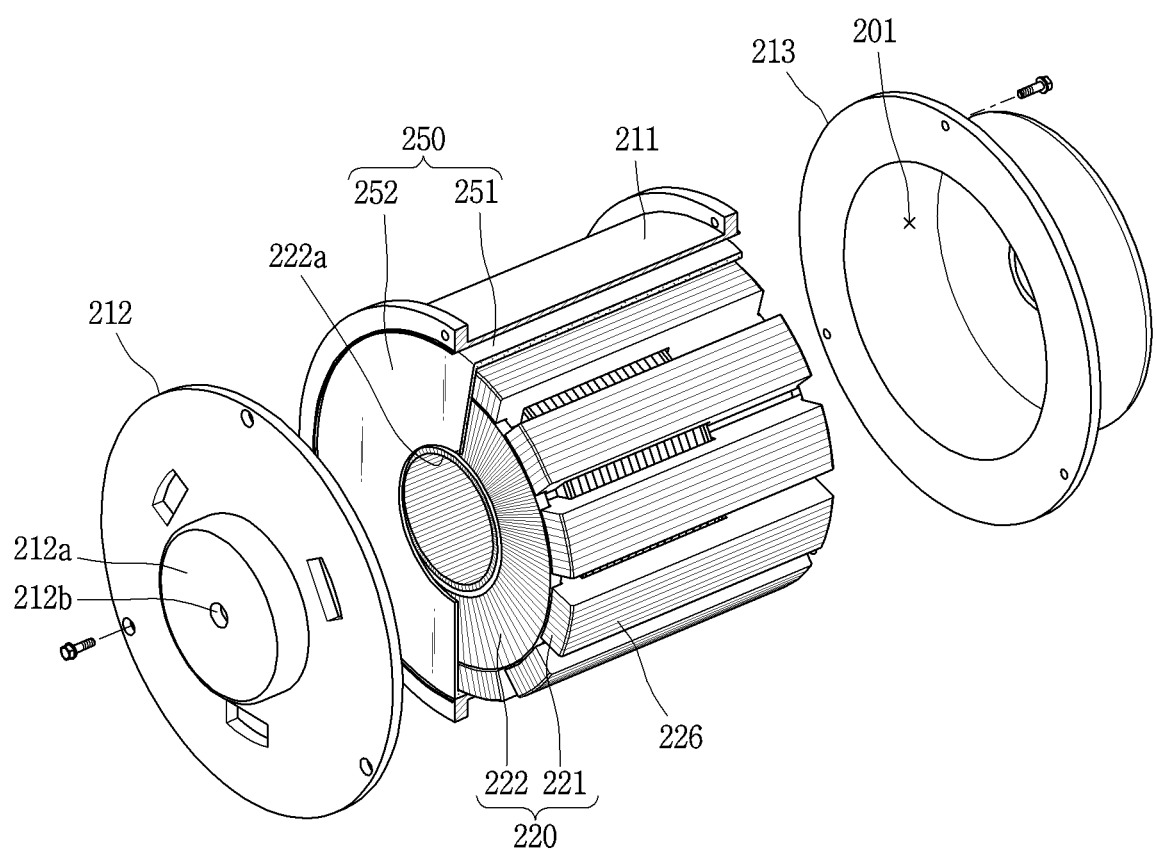
FIG. 13 is a perspective view illustrating an example housing separated from the linear compressor of FIG. 12.

FIG. 12 is a sectional view illustrating another implementation of a linear compressor according to the present disclosure, and FIG. 13 is a perspective view illustrating a housing separated from the linear compressor according to FIG. 12.

As illustrated in these drawings, a linear compressor 100 according to this implementation includes a housing 210, a driving unit 220, a compression unit 230, and a support bracket 240.

The housing 210 is disposed to be exposed to air, and configures a supporting unit. Accordingly, as described above, heat generated in a motor or heat generated in the compression unit is radiated to outside through the housing 210. In consideration of this, the housing 210 may be formed of a metallic material having a high thermal conductivity coefficient so as to rapidly dissipate heat generated in the driving unit 220 and the compression unit 230.

The housing 210 may also include an intermediate housing 211, a front housing 212, and a rear housing 213.

The intermediate housing 211 constituting a first housing may be formed in a cylindrical shape having both front and rear ends opened. An inner diameter of the intermediate housing 211 may be substantially the same as an outer diameter of a linear motor 220 constituting the driving unit, that is, an outer diameter of an outer stator 221. Accordingly, the outer stator 221 may be inserted to be in contact with an inner circumferential surface of the intermediate housing 211 so as to be fixed by the intermediate housing 211. However, in this implementation, a heat transfer member 250 to be described later may be inserted between the intermediate housing 211 and the outer stator 221, so that the inner diameter of the intermediate housing 211 can be greater than the outer diameter of the outer stator 221 by a thickness of the heat transfer member 250.

The front housing 212 constituting a second housing covers the front opening of the intermediate housing 211, and may be formed in a disk shape. One side surface of the front housing 212 may be supported by being closely adhered onto a front side of the linear motor 220, namely, a front surface of a stator 220a.

The front housing 212 may be provided with a discharge space portion 212a formed in an externally convex portion at a central portion thereof so as to form a part of a discharge space to be explained later. A discharge port 212b may be formed at a center of the discharge space portion 212a and a discharge pipe 216 may be connected to the discharge port 212b. The discharge pipe 216 may be formed of a pipe which has strength enough to support a compressor main body C in an axial direction by being coupled to a support bracket 240 to be described later. A structure by which the discharge pipe 216 is supported will be described later with the support bracket.

The rear housing 213 constituting a third housing covers the rear opening of the intermediate housing 211, and may be formed in various shapes depending on a length of the intermediate housing 211. For example, when the intermediate housing 211 is formed significantly longer than the stator 220a so as to sufficiently secure a space for a reciprocating movement of a mover 220b to be described later, the rear housing 213 may be formed in a disk shape which is the same shape as the front housing 212. In some implementations, when the length of the intermediate housing 211 is equal to or substantially similar to the length of the stator 220a, a space is required to allow the mover 220b to move. Therefore, the rear housing 213 may be formed in a cap-like shape having an inner space 201 forming a suction space.

The rear housing 213 may be provided with a suction port 213a formed at a central portion thereof, and a suction pipe 215 through which a refrigerant is introduced into a suction space of the housing 210 may be connected to the suction port 213a. The suction pipe 215, similar to the discharge pipe 216, may be formed of a pipe having a strength enough to support the compressor main body C by being coupled to the support bracket 240. However, when the housing 210 is supported on the support bracket 240 to be substantially slidable, a load applied to the suction pipe 215 and the discharge pipe 216 can be reduced. A structure by which the suction pipe is supported will be described later with the support bracket.

In some implementations, in this implementation, the housing 210 is formed to be long in a horizontal direction, but in some cases, may be formed to be long in a longitudinal direction depending on the arrangement of the driving unit 220 and the compression unit 230.

The driving unit 220 constituting the linear motor may be formed similarly to that in the foregoing implementation. However, the foregoing implementation has illustrated a two-gap structure having gaps at both sides in an axial direction with a coil interposed therebetween, but this implementation illustrates an example having a single-gap structure having a gap at only one side with respect to a coil. However, this is a modification of a general structure of the linear motor as needed, and does not affect the practical purpose and effect of the present disclosure.

For example, the driving unit 220 according to this implementation may include a stator 220a, and a mover 220b reciprocating with respect to the stator 220a.

The stator 220a may include an outer stator 221, and an inner stator 222 disposed inside the outer stator 221 by a predetermined gap 220c.

The outer stator 221 may include a coil winding body 225, and a stator core 226 arranged to surround the coil winding body 225, and the coil winding body 225 may include a bobbin 225a, and a winding coil 225b wound around the bobbin 225a in a circumferential direction of the bobbin 135a.

The stator core 226 may be formed by stacking a plurality of lamination sheets radially. Alternatively, the stator core 226 may be formed in a manner that a plurality of lamination sheets is stacked into a plurality of lamination blocks each having the same curvature on inner and outer circumferential surfaces and the plurality of lamination blocks are arranged along a circumferential direction. This implementation illustrates an example in which a plurality of stator cores is arranged along the circumferential direction.

The inner stator 222 may be formed in a cylindrical shape by stacking a plurality of lamination sheets radially. The plurality of lamination sheets may be maintained in the cylindrical shape by fixing rings which are press-fitted into both front and rear sides thereof.

Thus, a cylinder space 222a in a cylindrical shape may be formed in a central portion of the inner stator 222, and a cylinder 231, which will be described later, may be fixedly inserted into the cylinder space 222a. In addition, a space which is left after the cylinder 231 is inserted in the cylinder space 222a may form a first discharge space 204a and a part of a second discharge space 204b.

In some implementations, the outer stator 221 and the inner stator 222 may be spaced apart from each other at both front and rear sides thereof with the coil winding body 225 interposed therebetween, thereby forming a plurality of gaps. Alternatively, the outer stator 221 and the inner stator 222 may be spaced apart from each other at one side thereof and connected to each other at another side with the coil winding body 225 interposed therebetween, thereby forming one gap. In this case, magnets 224a, 224b may be coupled to the mover 220b or may be coupled to the stator 220a. This implementation exemplarily illustrates a linear motor in which one gap is formed as described above a magnet is coupled to a stator.

Magnets 224a and 224b as permanent magnets may be attached to pole portions 221a of the outer stator 221 forming gaps 220c. The pole portion 221a may be formed to be equal to or longer in length than the magnet 224a, 224b. Rigidity of a magnetic spring, an alpha value (a thrust constant or an induced voltage constant of a motor), an alpha value variation rate, and the like may be determined by a combination or structure of the stator as described above. The stator 220a may have a length or shape determined in various ranges depending on a design of a product to which the linear motor is applied.

The magnets 224a and 224b may be disposed so as not to overlap the winding coil 225b in a radial direction. Thus, a diameter of the motor can be reduced.

The magnets 224a and 224b may include a first magnet 224a and a second magnet 224b having different polarities and arranged in a reciprocating direction (also referred to as an axial direction) of the mover 220b. Accordingly, the magnets 224a and 224b may be formed as a 2-pole magnet having N pole and S pole in the same length on both sides thereof.

In this implementation, the magnets 224a and 224b are shown as being provided only at the outer stator 221, but the present disclosure is not limited thereto. For example, the magnets 224a and 224b may alternatively be provided only at the inner stator 222 or may be provided at both the outer stator 221 and the inner stator 222.

The mover 220b may be provided with a core holder 223a, and a magnetic core 223b supported on the core holder 223a.

The core holder 223a may be formed in a cylindrical shape, and have one end coupled to a piston 232 to be explained later and another end inserted into the gap 220c between the outer stator 221 and the inner stator 222 to perform a reciprocating motion. The core holder 223a may be placed in a free state in the axial direction, but in some cases, may be axially supported by a spring as shown in FIG. 12.

For example, as described above, the mover 220b of this implementation may perform a reciprocating motion by a magnetic resonance spring, which is formed by the winding coil 225b, the magnets and the magnetic core 223b. Accordingly, the mover 220b can perform the reciprocating motion even if the core holder 223a is not supported by a separate spring. However, it is necessary to restrict a movement of the mover 220b depending on a conveying or installation mode of the compressor. Therefore, in consideration of this, the mover 220b may be supported by a mover supporting spring 227 configured as a compression coil spring on a rear side of the core holder 223a.

The magnetic core 223b may be formed by stacking a plurality of magnetic sheets or fabricating the plurality of magnetic sheets into a shape of a block and then may be press-fitted into the core holder 223a. However, the magnetic core 223b may be fixedly attached to an outer circumferential surface of the core holder 223a or may be fixed using a separate fixing ring. Accordingly, the magnetic core 223b can perform a linear reciprocating motion together with the core holder 223a by a mutual electromagnetic force generated between the outer stator 221 and the inner stator 222.

In the driving unit 220 according to this implementation, when a current is applied to the winding coil 225b, a magnetic flux is formed in the stator 220a. A force that allows the mover 220b to move in left and right directions in the drawing may be generated by interaction between the magnetic flux formed by applying the current and a magnetic flux formed by the magnetic core 223b of the mover 220b to be explained later. Thus, the driving unit of the linear compressor according to the present disclosure can perform a function of a magnetic resonance spring to replace a mechanical resonance spring.

Accordingly, the driving unit 220 according to this implementation can provide thrust and restoring force for the reciprocating motion of the piston 232 by use of the stator 220a and the mover 220b. Here, the thrust refers to a force that pushes the mover 220b in a direction of motion, specifically, a force applied toward a top dead point in a compression stroke and toward a bottom dead point in a suction stroke. In some implementations, the restoring force refers to a force pushing the mover 220b toward a reference position (or an initial position). That is, the restoring force may be zero (0) at a reference position, and may be increased or decreased toward a top dead point or a bottom dead point away from the reference position.

Specifically, two kinds of magnetic fluxes may be formed in the stator 220a and the mover 220b according to this implementation. One is a magnetic flux forming a magnetic path interlinked with the winding coil 225b, and may play a role of generating the thrust described above. That is, one loop may be formed along the outer stator 221 and the inner stator 222 by a current applied to the winding coil 225b, which may generate thrust for compression and suction strokes of the mover 220b.

The other magnetic flux is formed to surround (spin round) the magnets 224a and 224b of this implementation, i.e., the first magnet 224a and the second magnet 224b, and may play a role of generating the restoring force in this implementation. More magnetic fluxes turning round the magnets 224a and 224b may be exposed to a side surface of a pole portion of the stator 220a forming the gap 220c as the magnetic core 223b of the mover 220b deviates from the reference position. Therefore, an absolute value of the restoring force formed by the magnetic flux surrounding the magnets 224a and 224b tends to increase as a distance from the reference position increases.

Accordingly, the driving unit 220 of this implementation generates a reciprocating centering force between the stator 220a and the mover 220b, that is, a force for storing the mover 220b toward low magnetic energy (magnetic position energy, magnetic resistance) when the mover 220b moves within a magnetic field. This force is referred to as a reciprocating centering force, and forms a magnetic resonance spring. Therefore, when the mover 220b performs a reciprocating motion by a magnetic force, the mover 220b may accumulate a force for returning toward a center by the magnetic resonance spring, and this force may cause the mover 220b to continuously perform the reciprocating motion while performing a resonance motion.

In some implementations, the stator 220a according to this implementation may be fixedly inserted into the housing, more precisely, into the intermediate housing 211.

For example, an outer circumferential surface of the outer stator 221 may be in close contact with an inner circumferential surface of the intermediate housing 211, or may be fixedly attached to the intermediate housing 211 with the heat transfer member 250 interposed therebetween. A front surface of the outer stator 221 as well as a front surface of the inner stator 222 may be in close contact with a rear surface of the front housing 212 or may be fixedly attached to the rear surface of the front housing 212 with the heat transfer member 250 interposed therebetween. Accordingly, the outer stator 221 and the inner stator 222 may be fixed to the housing in a state where a cylindrical space or gap is maintained by the intermediate housing 211 and the front housing 212. The heat transfer member will be described later.

The compression unit 230 may be similar to that in the foregoing implementation. For example, the compression unit 230 according to this implementation may include a cylinder 231, a piston 232, a suction valve 233, and a discharge valve 234. The compression unit 230 suctions a refrigerant in the inner space 201 into a compression space 203, compresses the refrigerant, and discharges the compressed refrigerant into a discharge space 204.

The cylinder 231 may be supportedly inserted into the cylinder space 222a of the inner stator 222 and form the compression space 203 therein. For example, a coating layer may be formed on an inner circumferential surface of a front side of the cylinder space 222a, and a separate cylinder stopper 235 for supporting a rear end of the cylinder 231 may be provided on a rear side of the cylinder space 222a.

Since the cylinder stopper 235 is closely attached to the inner circumferential surface of the inner stator 222, namely, the inner circumferential surface of the cylinder space 222a, the cylinder stopper 235 may be formed of a magnetic material. In some implementations, the cylinder stopper 235 may be formed of a nonmagnetic material in consideration of motor efficiency. The cylinder stopper 235 may be formed by sheet metal working in a drawing method or may be formed by using a mold.

The cylinder 231 may be formed in a cylindrical shape having both ends opened, and one end (hereinafter, referred to as a front end) of the cylinder 231 may be opened and closed by a discharge valve 234. The discharge space 204 may be formed at an opposite side of the compression space 203 with respect to the discharge valve 234, so that a refrigerant discharged from the compression space 203 is accommodated therein. One discharge space 204 may be formed, but a plurality of discharge spaces 204 may be formed sequentially in order to effectively attenuate discharge noise.

The discharge space 204 may include a first discharge space 204a formed in the inner stator 222, i.e., in the cylinder space 222a, and a second discharge space 204b formed outside the inner stator 222. In the case where the second discharge space 204b is formed outside the inner stator 222, the second discharge space 204b is exposed to external air, which may cause a temperature of a discharged refrigerant to be lowered, resulting in enhancing compressor efficiency.

In the cylinder 231, a part of a gas bearing may be formed to guide a refrigerant between the cylinder 231 and the piston 232. In other words, a plurality of bearing holes 231a may be formed through the cylinder 231 from an outer circumferential surface to an inner circumferential surface of the cylinder 231 so as to form a part of the gas bearing. Accordingly, a part of a compressed refrigerant is supplied to a gap between the cylinder 231 and the piston 232 through the bearing holes 231a so as to lubricate the gap between the cylinder 231 and the piston 232.

The piston 232 may have a suction flow path 202 therein, and may be formed in a cylindrical shape having a front end partially opened and a rear end fully opened. As described above, the piston 232 may be connected to the core holder 223a at its rear end, which is an open end, to reciprocate together with the core holder 223a.

A plurality of suction ports 232a communicating the suction flow path 202 with the compression space 203 may be formed on the front end of the piston 232. A suction valve 233 for selectively opening and closing the suction ports 232a may be provided on a front surface of the piston 232. Accordingly, a refrigerant suctioned into the inner space 201 of the housing 210 may open the suction valve 233 so as to flow into the compression space 203 in the cylinder 231 through the suction flow path 202 and the suction ports 232a of the piston 142.

The suction valve 233 may be formed in a disk shape so that the plurality of suction ports 232a can be opened or closed at a time, or may be formed in a petal shape having a plurality of opening and closing parts so that the suction ports 232a can be individually opened and closed.

A fixed portion of the suction valve 233 is determined depending on a position of the suction ports 232a. For example, when the suction ports 232a are formed at an edge, a central portion of the suction valve 233 may be coupled to a center of the front surface of the piston 232 by bolts or rivets.

The discharge valve 234 may be elastically supported by a valve spring 234a so as to open and close the compression space 203 on the front surface of the cylinder 231, and the valve spring 234a may be supported by a spring support member 236.

In some implementations, the support bracket 240, as aforementioned, is coupled to the suction pipe 215 and the discharge pipe 216 so that the compressor main body C is supported. The support bracket 240 may be formed in a shape having a concave-convex (凹) cross section in which perpendicular portions 242, 243 are formed at both ends of a horizontal portion 241.

Support holes 242a and 243a through which the discharge pipe 216 and the suction pipe 215 are inserted may be formed at ends of the perpendicular portions 242 and 243 of the support bracket 240, respectively. The discharge pipe 216 and the suction pipe 215 may be inserted into the support holes 242a and 243a, respectively, with buffering members 242b and 243b interposed therebetween.

A first support spring 245 and a second support spring 246 which are compression coil springs may be provided between the front buffering member 242b and the front housing 212 and between the rear buffering member 243b and the rear housing 213. Accordingly, even if the compressor main body C vibrates in an axial direction, the first support spring 245 and the second support spring 246 may elastically absorb it, thereby minimizing the vibration of the compressor.

The linear compressor according to this implementation of the present disclosure may operate as follows.

That is, the mover 220b performs a reciprocating motion in the gap 220c between the outer stator 221 and the inner stator 222 by an electromagnetic force generated in the stator 220a of the driving unit 220.

Then, the piston 232 connected to the mover 220b reciprocates linearly in the cylinder 231, so that a volume of the compression space 203 is increased or decreased. At this time, when the piston 232 is moved backward and the volume of the compression space 203 is increased accordingly, the suction valve 233 is opened so that a refrigerant in the suction flow path 202 is introduced into the compression space 203 through the suction ports 232a. In some implementations, when the piston 232 is moved forward and the volume of the compression space 203 is decreased accordingly, the piston 232 compresses the refrigerant in the compression space 203. The compressed refrigerant opens the discharge valve 234 and is discharged into the first discharge space 204a.

A part of the refrigerant discharged into the first discharge space 204a is supplied to a space between the inner circumferential surface of the cylinder 231 and the outer circumferential surface of the piston 232 through the bearing hole 231a of the cylinder 231 constituting the gas bearing, thereby supporting the piston 232 with respect to the cylinder 231. In some implementations, the remaining refrigerant discharged into the first discharge space 204a moves to the second discharge space 204b through a second discharge hole 261a, and then moves to a condenser of a refrigeration cycle through the discharge pipe 216. Such series of processes is repeated.

At this time, motor heat is generated in the linear motor 220 and compression heat is generated as the refrigerant is compressed in the compression space 203. The motor heat and the compression heat may be transmitted to the cylinder 231 and the piston 232 through the inner stator 222.

Accordingly, the refrigerant suctioned into the suction flow path 202 of the piston 232 may be heated and thus a specific volume of the refrigerant is raised to cause a suction loss, thereby lowering overall efficiency of the compressor.

Here, the oil-lubricated compressor may lower a temperature of the compression unit 230 while oil of relatively low temperature circulates between the cylinder 231 and the piston 232. However, as illustrated in this implementation, in the gas-lubricated compressor employing a gas bearing other than an oil bearing, a refrigerant of high temperature is introduced between the cylinder 231 and the piston 232. As a result, a temperature of the compression unit 230 further rises, which may cause the introduced refrigerant to be more increased in temperature.

However, in the gas-lubricated compressor as illustrated in this implementation, when the stator 220a is fixedly inserted into the housing 210 forming the casing, a gap between the stator 220a and the housing 210 may be reduced and thus heat radiation through the housing 210 can be more facilitated.

Figure 14:
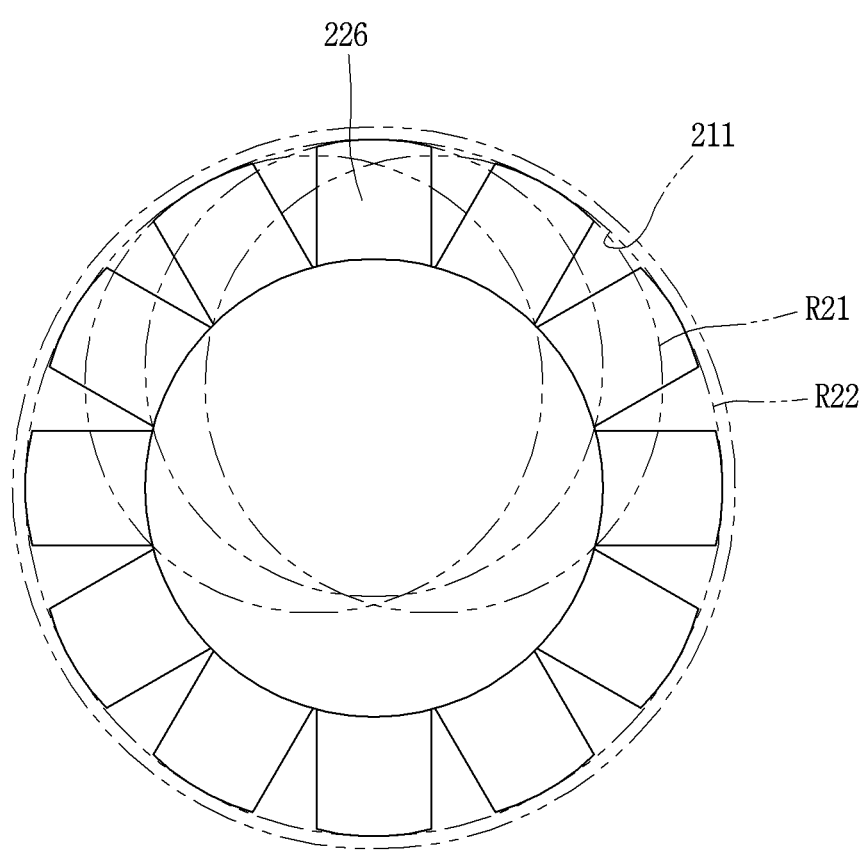
FIG. 14 is a schematic view illustrating an outer circumferential surface of an example outer stator and an inner circumferential surface of an example housing in an example linear motor.

However, fine clearances may be generated between an outer circumferential surface and a side surface of the stator and an inner circumferential surface and an inner surface of the housing in contact therewith due to a machining error or assembly error. FIG. 14 is a schematic view illustrating an outer circumferential surface of an outer stator and an inner circumferential surface of a housing in a linear motor according to the present disclosure, and FIG. 15 is an enlarged schematic view illustrating a part of the outer stator in FIG. 14.

As illustrated in FIG. 14, when each of the stator cores 226 constituting the outer stator 221 is fabricated by stacking individual lamination sheets into an arcuate shape and the fabricated stator cores 226 are radially arranged, a curved line R21 that connects outer surfaces of the respective stator cores 226 forms a circle including a plurality of curved lines like petals. On the contrary, a curve R22 connecting the inner circumferential surface of the intermediate housing 211 forms one circle.

Figure 15:
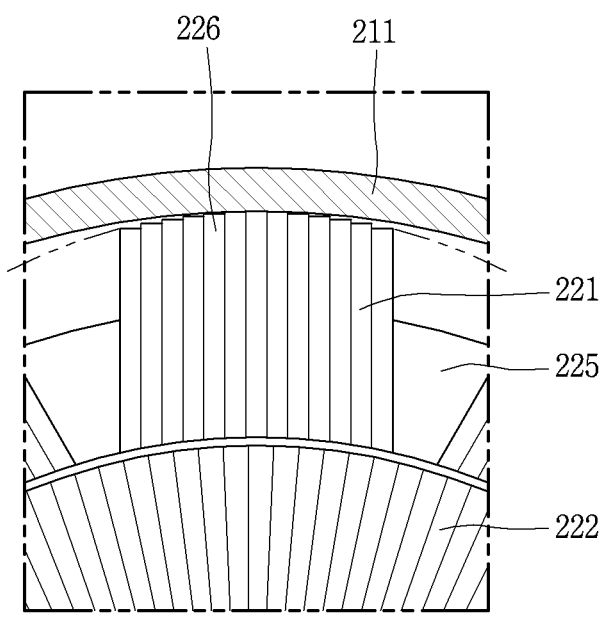
FIG. 15 is an enlarged schematic view illustrating an example part of the outer stator in FIG. 14.

In this case, as shown in FIG. 15, the outer circumferential surface of each stator core 226 and the inner circumferential surface of the intermediate housing 211 are brought into contact with each other only at one point when projected in an axial direction. In addition, since the outer circumferential surface of the stator core 226 forming the outer stator 221 forms a curved surface with a height difference among the plurality of lamination sheets, a gap from the intermediate housing 211 is increased from a central portion to both ends by the height difference.

Then, an actual contact area between the inner circumferential surface of the intermediate housing 211 and the outer circumferential surface of the outer stator 226 may be remarkably reduced, which may cause an actual heat transfer effect for the linear motor to be drastically reduced. In addition, an air layer, which is a heat insulating layer, may be generated between the intermediate housing 211 and the outer stator, and thus a heat radiation effect for the linear motor can be very low.

Figure 16:
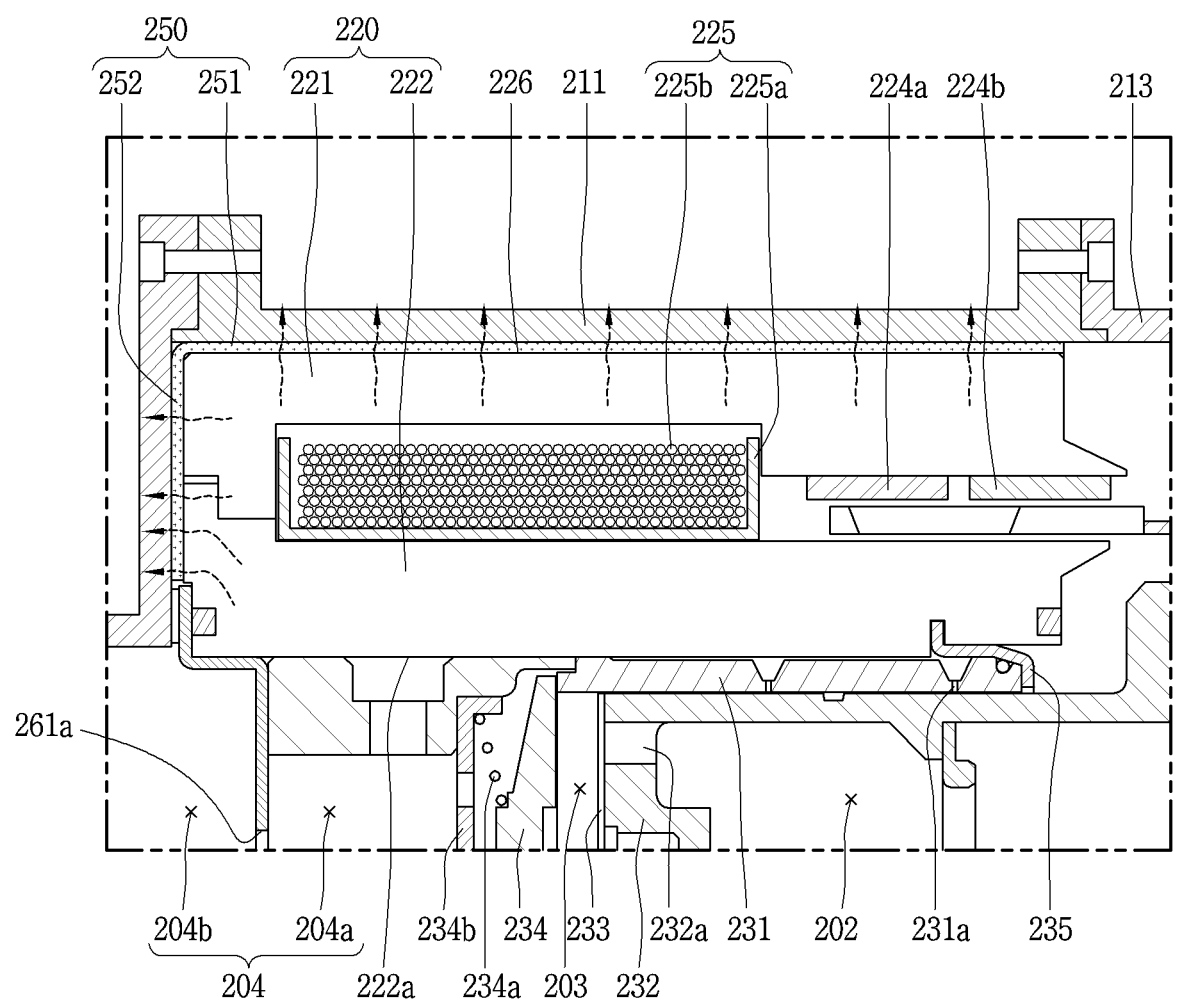
FIG. 16 is an enlarged sectional view illustrating a part of an example linear compressor including a heat transfer member.
Figure 17:
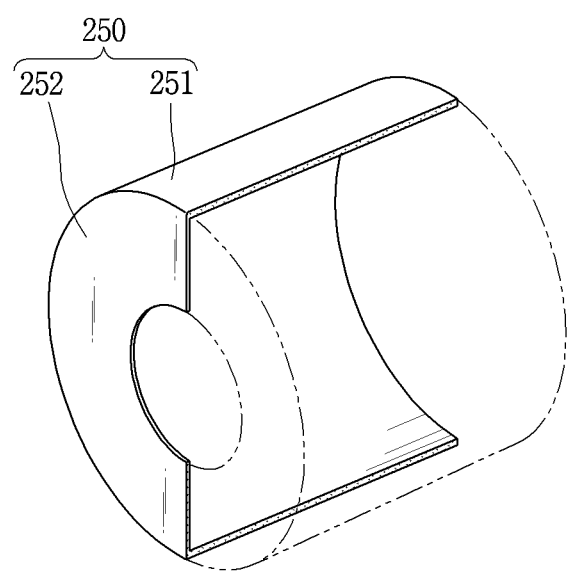
FIG. 17 is a cut perspective view illustrating one implementation of the heat transfer member illustrated in FIG. 16.

In view of this, in some implementations, a heat transfer member made of a thermally conductive material may be inserted between the outer stator and the housing 210. FIG. 16 is an enlarged sectional view illustrating a part of a linear compressor having a heat transfer member in accordance with an implementation of the present disclosure, and FIG. 17 is a cut perspective view illustrating one implementation of the heat transfer member illustrated in FIG. 16.

As illustrated in FIGS. 13 and 16, a heat transfer member 250 may include a first portion 251 surrounding the entire outer circumferential surface of the outer stator 221, and a second portion 252 surrounding a front surface of the stator 220a where the outer stator 221 and the inner stator 222 are connected to each other.

The first portion 251 may have a cylindrical shape and the second portion 250b may have an annular disk shape, so that the heat transfer member 250 substantially has a cup-like shape. As illustrated in FIG. 17, the first portion 251 and the second portion 252 of the heat transfer member 250 may be integrally formed with each other. In this case, the first portion 251 and the second portion 252 of the heat transfer member 250 can be assembled at one time, and its assembly performance can be improved accordingly.

In some implementations, the heat transfer member 250 may be made of a material having a thermal conductivity coefficient higher than a thermal conductivity coefficient of the lamination sheets constituting the outer stator 221 and a thermal conductivity coefficient of the housing 210, in view of enhancing the heat radiation effect.

Figure 18A:
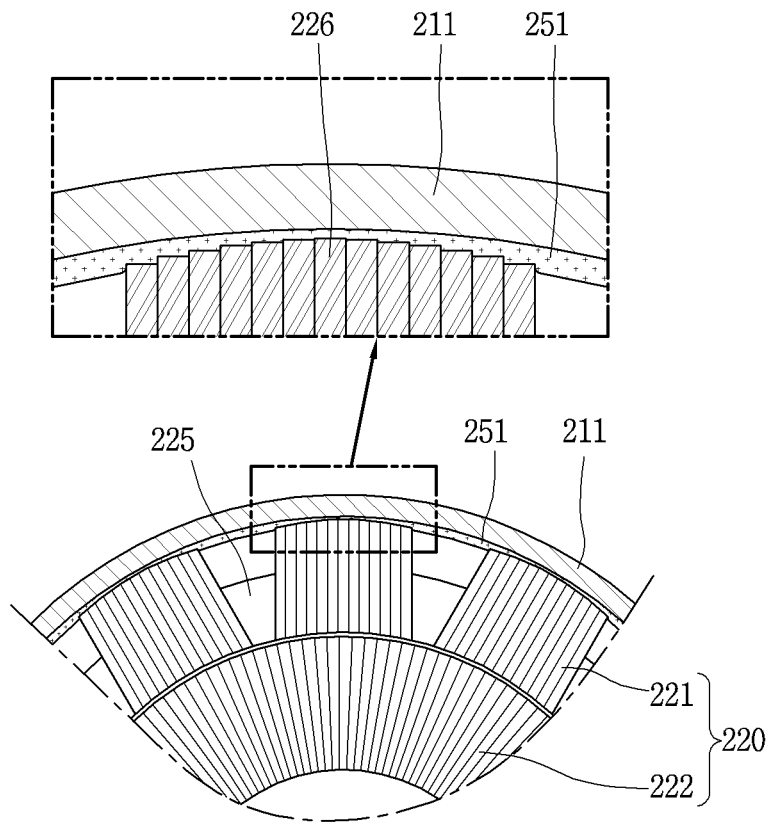
FIG. 18A is a sectional view illustrating an example first portion of an example heat transfer member in an axial direction.
Figure 18B:
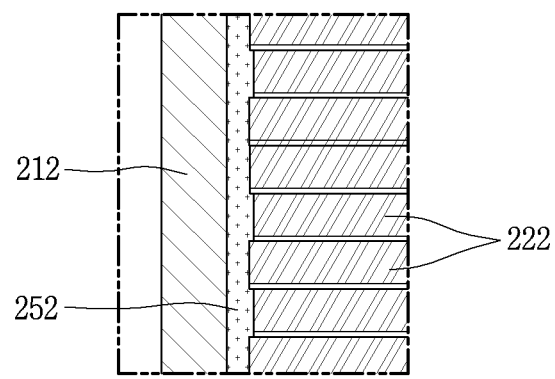
FIG. 18B is a sectional view illustrating an example second portion of the heat transfer member of FIG. 18A in a radial direction.

The heat transfer member 250 may be formed of a rigid material, but may alternatively be formed of a material having elasticity. Accordingly, as illustrated in FIGS. 18A and 18B, the outer circumferential surface of the outer stator 221 and the inner circumferential surface of the intermediate housing 211 or the front surface of the stator 220a and the inner surface of the front housing 212 may be more tightly attached to each other. FIG. 18A is a sectional view illustrating the first portion of a heat transfer member in an axial direction, and FIG. 18B is a sectional view illustrating the second portion of the heat transfer member in a radial direction.

As illustrated, when the heat transfer member 250 having such high thermal conductivity is provided between the stator 220a and the housing 210, motor heat or compression heat transferred to the stator can quickly move to the housing 210 so as to prevent the cylinder 231 and the piston 232 from being overheated, thereby preventing a suction loss or compression loss in advance. In addition, it may be possible to prevent overheating of the linear motor 220 and enhance efficiency of the compressor accordingly.

In addition, when the heat transfer member 250 is made of a material having elasticity, even if vibration is generated in the compressor while the mover 220b and the piston 232 reciprocate during an operation of the compressor, the vibration can be absorbed by the heat transfer member 250, thereby reducing compressor noise. For this purpose, the heat transfer member 250 may be formed of a material having an elasticity coefficient higher than that of the outer stator 226 or the housing 210.

Figure 19:
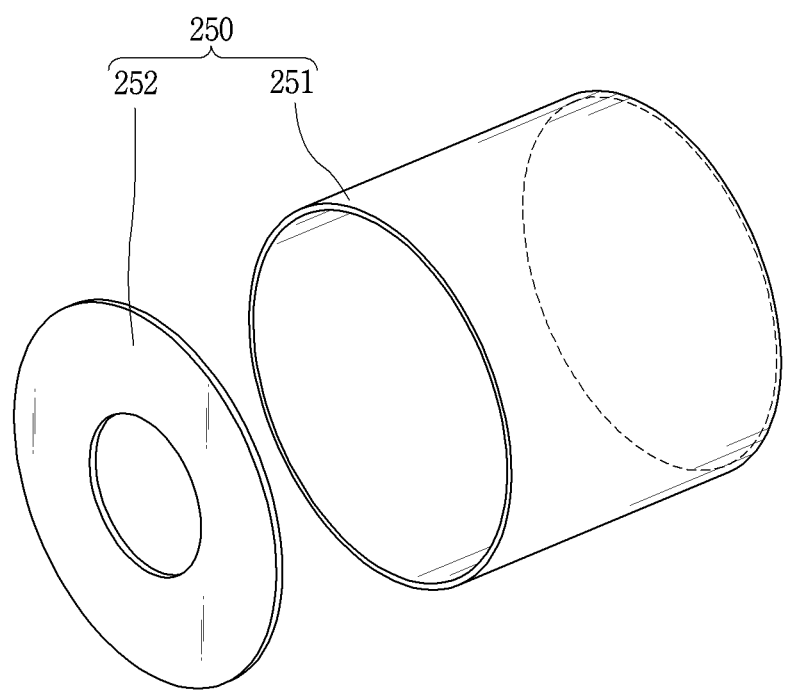
FIG. 19 is a perspective view illustrating an example of a separate type heat transfer member.

In some implementations, the first portion and the second portion of the heat transfer member are integrally formed, but, in some cases, the first portion and the second portion may be formed independently of each other. FIG. 19 is a perspective view illustrating a separate type heat transfer member in accordance with an implementation of the present disclosure.

As shown in FIG. 19, a first heat transfer member 251 forming a first portion may be formed in a cylindrical shape, and a second heat transfer member 252 forming a second portion may be formed in an annular disk shape. In this case, since the first heat transfer member 251 and the second heat transfer member 252 are independently formed, the first heat transfer member 251 and the second heat transfer member 252 can be separately manufactured and assembled.

Accordingly, the first heat transfer member 251 and the second heat transfer member 252 can be formed to have different thicknesses or formed of different materials as required. For example, as the outer circumferential surface of the stator 220a forms a curved surface, an assembly error may be larger than that of the front surface of the stator 220a. In this case, the thickness of the first heat transfer member 251 may be thicker than the thickness of the second heat transfer member 252.

Since the second heat transfer member 252 is positioned closer to the cylinder 231 than the first heat transfer member 251, the second heat transfer member 252 may be made of a material having a thermal conductivity coefficient higher than that of a material forming the first heat transfer member 251.

Figure 20:
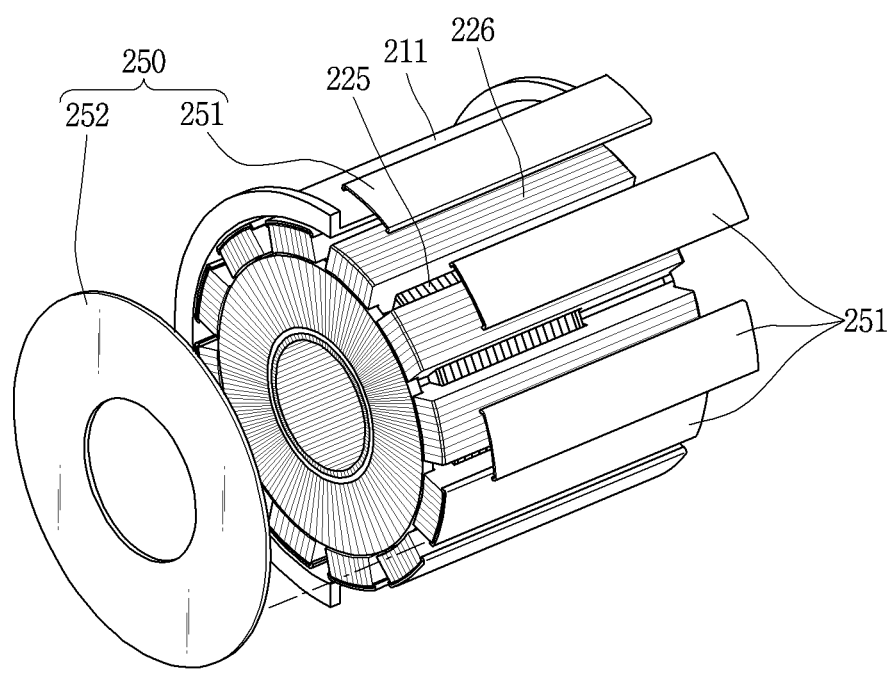
FIG. 20 is a perspective view illustrating an example heat transfer member independently provided at each stator core in an example separate type heat transfer member.

In some implementations, in the implementation of FIG. 19, the first heat transfer member may be formed in a single cylindrical shape, but may be formed to have a plurality of cylindrical shapes, in some cases. FIG. 20 is a perspective view illustrating heat transfer members independently provided at each stator core in a separate type heat transfer member in accordance with an implementation of the present disclosure.

As shown in FIG. 20, the first heat transfer members 251 are formed in the same number as the number of the stator cores 226, so as to independently cover the outer circumferential surfaces of the respective stator cores 226.

The first heat transfer member 251 may be formed to be flat so as to cover only the outer circumferential surface of each outer stator 226, but may be formed in a shape having a cross section like E for surrounding the outer circumferential surface and side surfaces of the outer stator 226 so as to be independently assembled to the outer stator 226.

As the first heat transfer member 251 is independently attached to the outer stator 226, in order to increase a coupling force, the first heat transfer member 251 may be bonded to each outer stator 226 or formed to have elasticity or predetermined rigidity.

Hereinafter, description will be given of another implementation of a linear compressor according to the present disclosure.

Figure 21:
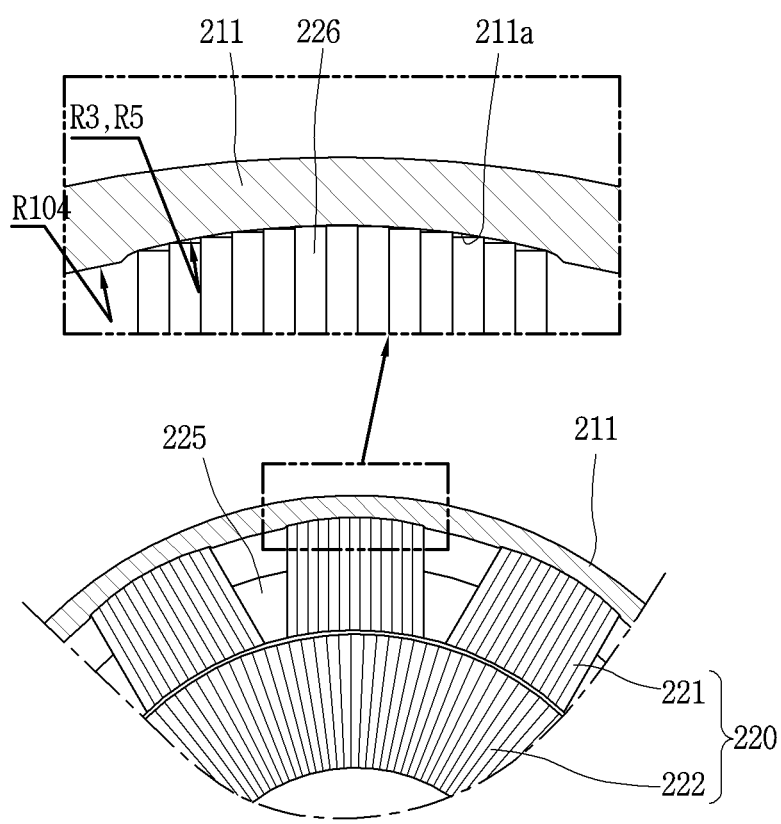
FIGS. 21 and 22 are sectional views illustrating different examples of a housing in a linear compressor.
Figure 22:
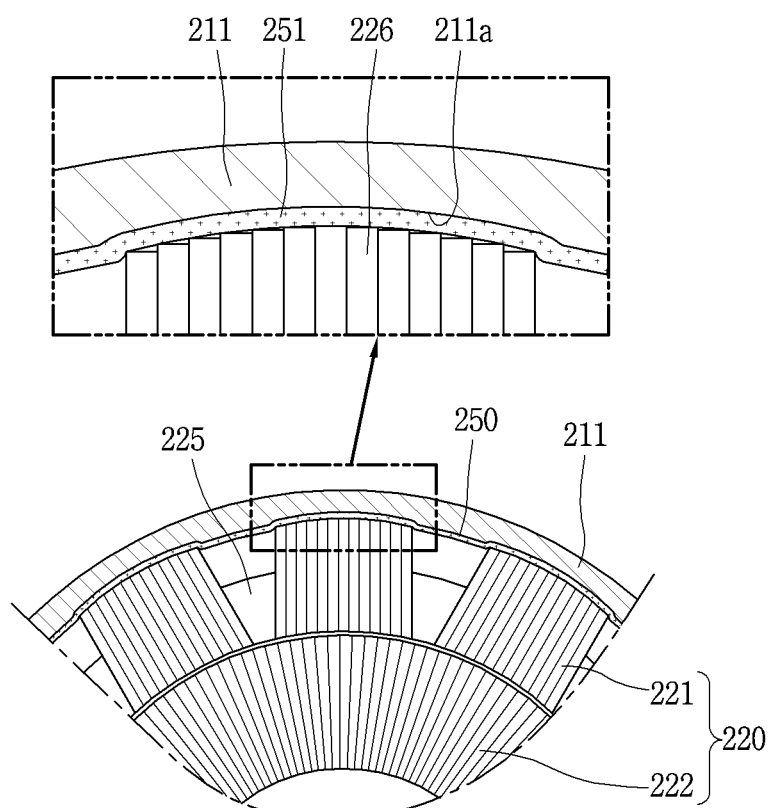

That is, the foregoing implementation illustrates that the inner circumferential surface of the intermediate housing 211 is formed to have a cross section in a shape of one perfect circle. However, this implementation illustrates that the inner circumferential surface of the intermediate housing 211 has a cross section in a shape of a non-perfect circle having a plurality of circles to correspond to the shape of the outer stator. FIGS. 21 and 22 are sectional views illustrating different implementations of a housing in a linear compressor according to the present disclosure.

As shown in FIG. 21, a plurality of stator insertion grooves 211a may be formed on a portion of the inner circumferential surface of the intermediate housing 211 corresponding to the outer circumferential surfaces of the outer stators 226.

A curvature R3 of the inner circumferential surface of the stator insertion groove 211a may be larger than a curvature R4 of the inner circumferential surface of the intermediate housing 211 and the same as a curvature R5 of the outer circumferential surface of the outer stator 226.

Accordingly, the inner circumferential surface of the intermediate housing 211 and the outer circumferential surface of the outer stator 226 can be closely adhered with each other, thereby narrowing a gap between the intermediate housing 211 and the outer stator. Accordingly, as illustrated in FIG. 21, even without a separate heat transfer member between the outer stator 226 and the intermediate housing 211, a heat transfer effect between the outer stator 226 and the intermediate housing 211 can be enhanced, thereby allowing heat of the linear motor 220 to be fast radiated through the housing.

Of course, as illustrated in FIG. 22, even when the stator insertion groove 211a is formed on the inner circumferential surface of the intermediate housing 211, the heat transfer member 250 having such high thermal conductivity coefficient may be inserted between the inner circumferential surface of the intermediate housing 211 and the outer circumferential surface of the outer stator 226. The heat transfer member 250 may be formed in the same shape and of the same material as those in the foregoing implementations, and operation effects obtained may be the same.

Hereinafter, description will be given of another implementation of a linear compressor according to the present disclosure.

Figure 23:
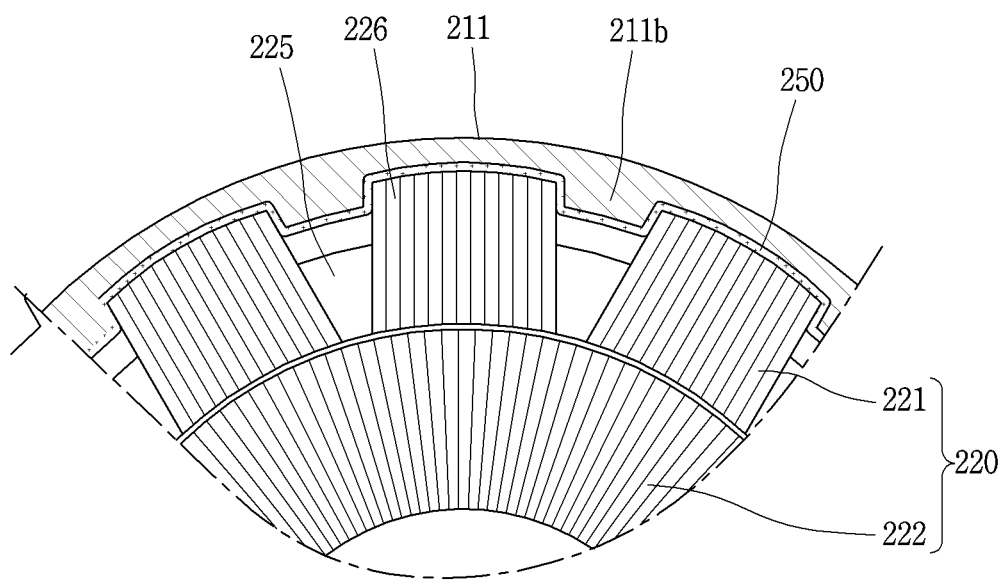
FIG. 23 is a sectional view illustrating another example of a housing in a linear compressor.

The foregoing implementation illustrates that the inner circumferential surface of the intermediate housing is formed in a circular shape so that an empty space is formed between the stator cores of the outer stator, but this implementation illustrates that at least one heat radiating portion is further provided on the inner circumferential surface of the intermediate housing. As a result, a surface area of the intermediate housing can be enlarged to more effectively discharge motor heat or compression heat. FIG. 23 is a sectional view illustrating another implementation of a housing in a linear compressor in accordance with an implementation of the present disclosure.

As shown in FIG. 23, the intermediate housing according to this implementation may be provided with at least one heat radiating portion formed on the inner circumferential surface thereof.

The heat radiating portion may be formed in an arcuate cross-sectional shape when projected in an axial direction, and may protrude toward an outer circumferential surface of the coil winding body. An inner diameter of the heat radiating portion may be smaller than an outer diameter of the outer stator and smaller than or equal to an outer diameter of the coil winding body.

The heat radiating portion may be located between the stator cores of the outer stator, and may be formed such that both side surfaces of the heat radiating portion are brought into contact with both side surfaces of the stator core in a circumferential direction, in terms of a heat transfer.

In the linear compressor according to this implementation as described above, the surface area of the intermediate housing is enlarged by the heat radiating portion, so that motor heat generated in the linear motor and compression heat generated in the compression unit can be quickly discharged. Accordingly, a suction loss or compression loss caused due to overheating of the cylinder and the piston can be effectively suppressed, and overheating of the motor can be suppressed, thereby increasing compressor efficiency.

In some examples including this case, the aforementioned heat transfer member may be provided between the outer stator and the inner circumferential surface of the intermediate housing. The basic structure and operation effects are the same as those of the foregoing implementations.

Hereinafter, description will be given of another implementation of a linear compressor according to the present disclosure.

Figure 24:
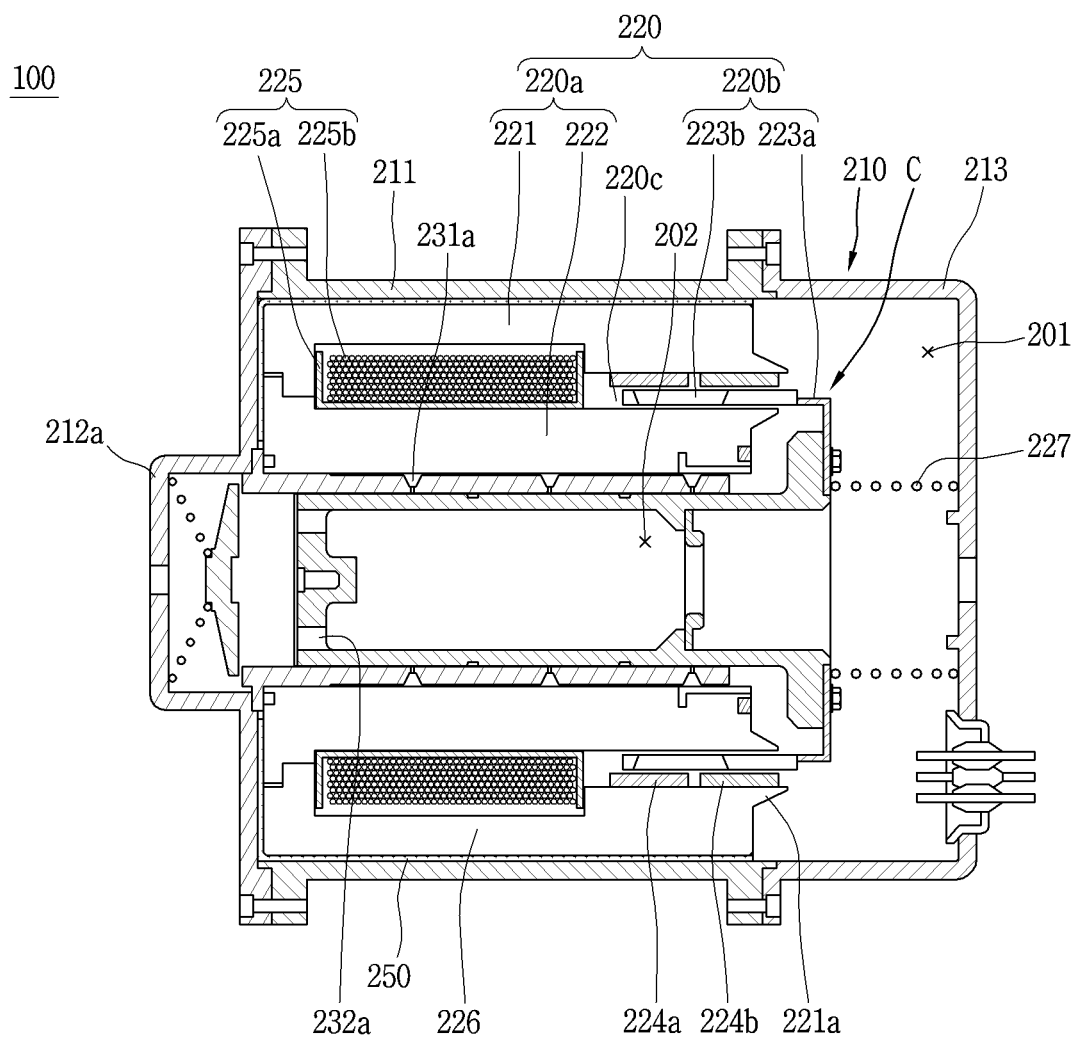
FIG. 24 is a sectional view illustrating another example of a linear compressor having a heat transfer member.

That is, the foregoing implementations illustrates a so-called embedded scroll compressor in which the discharge valve is disposed in the cylinder space, but the present disclosure may equally be applied to a linear compressor, as illustrated in FIG. 24, in which the discharge valve 234 is disposed outside the cylinder space 222a. The basic structure and operation effects of this implementation are the same as or similar to those of the foregoing implementations, and thus a detailed description thereof will be omitted. However, in this implementation, since the discharge valve 234 is located outside the cylinder space 222a, the discharge space 204 is located outside the range of the linear motor 220. Accordingly, the surface area that the front housing 212 forming the discharge space 204 is brought into contact with the outside can be enlarged, thereby further enhancing the heat radiation effect, as compared with the foregoing implementations.

In some implementations, the compressor main body is enclosed by the housing in a manner that the housing is exposed to outside and simultaneously the housing is supported by the support bracket, thereby reducing a size of the compressor and simultaneously simplifying a structure of the support bracket for supporting the compressor. This may allow the supporting structure to be commonly used regardless of the standard of the compressor main body.

In some implementations, the foregoing implementations exemplarily illustrate that the compressor main body is supported by coupling the suction pipe and the discharge pipe to the support bracket. However, in some cases, the suction pipe and the discharge pipe may be provided separately from support members supported by the support bracket.

The implementations according to the present disclosure may be modified in various ways by those skilled in the art within the scope of the basic technical idea, and the scope of the present disclosure should be interpreted based on the appended claims.

What is claimed is:
1. A linear compressor, comprising:
 a cylinder that defines a compressor space and that is configured to compress refrigerant in the compressor space;
 a piston located in the cylinder and configured to perform a reciprocating motion in an axial direction relative to the cylinder;

a mover coupled to the piston and configured to transmit a driving force to the piston to cause the piston to perform the reciprocating motion;

a stator that defines a cylinder space that receives the cylinder, the stator being configured to generate the driving force together with the mover; and a supporting unit that includes an overlap portion that covers at least a portion of the stator, that is coupled to the stator, and that contacts the stator, the supporting unit comprising frame that faces a side surface of the stator in the axial direction and that supports the stator in the axial direction, wherein the stator comprises an inner stator and an outer stator located outside the inner stator, and wherein the frame comprises:
- a body portion that has a cylindrical shape and is coupled to the inner stator,
- a flange portion that extends radially from a front end of the body portion and is coupled to the outer stator, and
- at least one heat radiating portion that extends from an outer circumference of the flange portion in the axial direction and that extends along the outer circumference of the flange portion.

2. The linear compressor of claim 1, wherein at least a part of the heat radiating portion is located radially outward relative to an outer circumference of the outer stator.

3. The linear compressor of claim 2, wherein the stator comprises a plurality of stator cores that are stacked and that are arranged at intervals in a circumferential direction, and
wherein the at least one heat radiating portion extends along one of the intervals between the plurality of stator cores.

4. The linear compressor of claim 3, wherein the at least one heat radiating portion has side surfaces that face the plurality of stator cores in the circumferential direction, and
wherein at least one of the side surfaces faces a side surface of the plurality of stator cores in the circumferential direction.

5. The linear compressor of claim 4, wherein the at least one heat radiating portion defines a heat radiation hole that extends from an inner circumferential surface of the heat radiating portion to an outer circumferential surface of the heat radiating portion.

6. The linear compressor of claim 3, wherein the at least one heat radiating portion has side surfaces that face the plurality of stator cores in the circumferential direction, and
wherein at least one of the side surfaces is spaced apart from a side surface of the plurality of stator cores in the circumferential direction.

7. The linear compressor of claim 1, further comprising a stator cover that is located at an opposite side of the frame with respect to the stator, that is configured to support the stator in the axial direction, and that contacts the at least one heat radiating portion.

8. The linear compressor of claim 7, wherein the at least one heat radiating portion defines a coupling hole that extends in the axial direction and that is configured to receive a coupling bolt configured to couple the frame to the stator cover.

9. The linear compressor of claim 1, further comprising a casing that defines a hermetic inner space, the casing having an inner circumferential surface that is spaced apart from an outer circumferential surface of the stator.

10. The linear compressor of claim 1, wherein the supporting unit comprises a housing that has an inner surface that defines a hermetic inner space, and
wherein the stator is inserted into the hermetic inner space and faces the inner surface of the housing.

11. The linear compressor of claim 1, further comprising a stator cover that is located at an opposite side of the frame with respect to the stator, that is configured to support the outer stator in the axial direction, and that contacts the at least one heat radiating portion.

12. The linear compressor of claim 11, wherein the stator further comprises a plurality of stator cores disposed at the outer stator and spaced apart from one another in a circumferential direction of the outer stator, and
wherein the at least one heat radiating portion extends through a space between adjacent stator cores among the plurality of stator cores.

13. The linear compressor of claim 12, wherein side surfaces of the at least one heat radiating portion face the adjacent stator cores in the circumferential direction.

14. The linear compressor of claim 12, wherein the plurality of stator cores have a first side in contact with the flange portion, and a second side in contact with the stator cover.

* * * * *